Dec. 21, 1965 F. C. HALLDEN ETAL 3,225,332

DATA ACCUMULATION SYSTEMS

Filed Feb. 3, 1961 24 Sheets-Sheet 1

INVENTORS
FREDERICK C. HALLDEN
LOUIS S. CONOVER, JR.
JULIUS J. FARKAS
CURTIS H. RICHMOND

BY [signature]

ATTORNEYS

INVENTORS
FREDERICK C. HALLDEN
LOUIS S. CONOVER, JR.
JULIUS J. FARKAS
CURTIS H. RICHMOND
BY
ATTORNEYS

INVENTORS
FREDERICK C. HALLDEN
LOUIS S. CONOVER, JR.
JULIUS J. FARKAS
CURTIS H. RICHMOND
BY
ATTORNEYS

INVENTORS
FREDERICK C. HALLDEN
LOUIS S. CONOVER, JR.
JULIUS J. FARKAS
CURTIS H. RICHMOND
BY Pennie, Edmonds, Morton, Barrows & Taylor
ATTORNEYS INVENTORS
FREDERICK C. HALLDEN
LOUIS S. CONOVER, JR.
JULIUS J. FARKAS
CURTIS H. RICHMOND
BY Pennie, Edmonds, Morton, Barrows & Taylor
ATTORNEYS INVENTORS
FREDERICK C. HALLDEN
LOUIS S. CONOVER, JR.
JULIUS J. FARKAS
CURTIS H. RICHMOND BY [signature]

ATTORNEYS

Dec. 21, 1965 F. C. HALLDEN ETAL 3,225,332

DATA ACCUMULATION SYSTEMS

Filed Feb. 3, 1961 24 Sheets-Sheet 7

INVENTORS
FREDERICK C. HALLDEN
LOUIS S. CONOVER, JR.
JULIUS J. FARKAS
CURTIS H. RICHMOND

BY [signature]

ATTORNEYS

INVENTORS
FREDERICK C. HALLDEN
LOUIS S. CONOVER, JR.
JULIUS J. FARKAS
CURTIS H. RICHMOND
BY Pennie, Edmonds, Morton, Barrows & Taylor
ATTORNEYS INVENTORS
FREDERICK C. HALLDEN
LOUIS S. CONOVER, JR.
JULIUS J. FARKAS
CURTIS H. RICMOND
BY Pennie Edmonds
Morton Barrows & Taylor
ATTORNEYS INVENTORS
FREDERICK C. HALLDEN
LOUIS S. CONOVER, JR
JULIUS J. FARKAS
CURTIS H. RICHMOND
BY
*[signature]*
ATTORNEYS INVENTORS
FREDERICK C. HALLDEN, LOUIS S. CONOVER, JR
JULIUS J. FARKAS, CURTIS H. RICHMOND
BY
ATTORNEYS INVENTORS
FREDERICK C. HALLDEN
LOUIS S. CONOVER, JR.
JULIUS J. FARKAS
CURTIS H. RICHMOND BY [signature]
ATTORNEYS INVENTORS
FREDERICK C. HALLDEN
LOUIS S. CONOVER, JR.
JULIUS J. FARKAS
CURTIS H. RICHMOND
BY
ATTORNEYS INVENTORS
FREDERICK C. HALLDEN
LOUIS S. CONOVER, JR
JULIUS J. FARKAS
CURTIS H. RICHMOND
BY
ATTORNEYS INVENTORS
FREDERICK C. HALLDEN
LOUIS S. CONOVER, JR.
JULIUS J. FARKAS
CURTIS H. RICHMOND
BY
ATTORNEYS INVENTORS
FREDERICK C. HALLDEN
LOUIS S. CONOVER, JR.
JULIUS J. FARKAS
CURTIS H. RICHMOND
BY Pennie Edmonds Morton Barrows & Taylor
ATTORNEYS INVENTORS
FREDERICK C. HALLDEN
LOUIS S. CONOVER, JR.
JULIUS J. FARKAS
CURTIS H. RICHMOND
BY [signature]
ATTORNEYS INVENTORS
FREDERICK C. HALLDEN
LOUIS S. CONOVER, JR.
JULIUS J. FARKAS
CURTIS H. RICHMOND
BY
Pennie Edmonds Morton Barrows & Taylor
ATTORNEYS INVENTORS
FREDERICK C. HALLDEN
LOUIS S. CONOVER, JR.
JULIUS J. FARKAS
CURTIS H. RICHMOND
BY
ATTORNEYS INVENTORS
FREDERICK C. HALLDEN
LOUIS S. CONOVER, JR.
JULIUS J. FARKAS
CURTIS H. RICHMOND
BY
ATTORNEYS INVENTORS
FREDERICK C. HALLDEN
LOUIS S. CONOVER, JR
JULIUS J. FARKAS
CURTIS H. RICHMOND
BY [signature]
ATTORNEYS INVENTORS
FREDERICK C. HALLDEN
LOUIS S. CONOVER, JR.
JULIUS J. FARKAS
CURTIS H. RICHMOND
BY [signature]
[signature]
ATTORNEYS INVENTORS
FREDERICK C. HALLDEN
LOUIS S. CONOVER, JR.
JULIUS J. FARKAS
CURTIS H. RICHMOND
BY Pennie, Edmonds, Morton, Barrows & Taylor
ATTORNEYS INVENTORS
FREDERICK C. HALLDEN
LOUIS S. CONOVER, JR.
JULIUS J. FARKAS
CURTIS H. RICHMOND
BY
ATTORNEYS 3,225,332

DATA ACCUMULATION SYSTEMS

Frederick C. Hallden, Huntington, Louis S. Conover, Jr., North Babylon, Julius J. Farkas, Huntington Station, and Curtis H. Richmond, Plainview, N.Y., assignors to Cutler-Hammer, Inc., Milwaukee, Wis., a corporation of Delaware Filed Feb. 3, 1961, Ser. No. 87,037
5 Claims. (Cl. 340—172.5)

This invention relates to data accumulation systems, and particularly to systems for continuously accumulating data on different characteristics of a continuously moving strip of material and presenting the data at desired intervals in convenient form for use.

Many manufacturing operations involve the production of material in strip form, such as tin-plate, paper, wire, etc. Often the strip is produced practically continuously, or in long lengths which are then coiled on reels of desired length, cut into shorter strips for future use, etc.

It is often desired to know the characteristics of the material thus produced. These characteristics may be electrical, mechanical, metallurgical, etc., and may be in the nature of defects or in the nature of characteristics which should lie within certain tolerances for the intended use. In some cases a considerable number of characteristics require measurement, and the nature of the sensors for detecting or measuring the characteristics may require that they be spaced at considerable intervals along the path of the strip for proper functioning. Yet, when a given length of strip has passed by the detecting stations, it is often desired to know the variations in the characteristics of that particular strip length. This requires that due account be taken of the spread of the individual sensors, so that the accumulated data concerning the characteristics will apply to a given strip length.

It is often required that individual characteristics be accumulated separately so as to permit determining whether they all lie within required tolerances, or to permit grading, etc. Further, it may be desired to accumulate not only data pertaining to each particular strip length, but also data pertaining to a given run, 8-hour shift, etc.

Depending upon the requirements of a given application, the problem of designing a suitable data accumulation system may be quite formidable, particularly when considerations of initial cost, reliability, rapid supply of the desired information, etc. are taken into account. Completely separate means for accumulating data for each type of characteristic or defect may involve such large costs as to limit seriously the marketability of the complete equipment.

The present invention is directed to a data accumulation system which is capable of meeting the foregoing requirements. While the system is necessarily complex and fairly expensive in order to fulfill the operating requirements, duplication has been avoided insofar as possible, except when desirable for reliability.

The systems may be considered as involving three major functions. The first is the detection or sensing of defects or other characteristics to be accumulated, and the equalization of the input signals so that they apply to the portions of the strip which bear those characteristics. The second is to accumulate the characteristics for a particular length of strip, 8-hour shift, etc. The third is the extraction of data from the accumulator for recording at the desired times.

In accordance with the invention, loop storage systems are employed in connection with the equalization of input signals, and the accumulation thereof. In the loop storage systems signals are continuously recirculated, and successive recirculations occur in what are termed "orbits."

In the equalizer, the orbit is divided into a number of time intervals or "channels" in which different types of defects or other characteristics are entered. Each data channel is sub-divided into sub-intervals termed "foot intervals" which permit entering each input signal in an interval corresponding to the distance from a predetermined point at which it is produced. As the strip travels toward the predetermined point, the input signals are transferred or shifted from foot interval to foot interval in timed relatioinship with the strip movement, until they reach a sub-interval corresponding to the predetermined point. In this manner output signals are obtained which represent the characteristics of the particular portion of the strip which is at the predetermined point.

In the accumulator, the equalized signals are again stored in one or more loop storage systems. In order to obtain totals for each type of defect or other characteristic, the incoming signals are coded, advantageously in a binary-decimal code, and successive occurrences of a given type are added to the previously stored total thereof. The totals are kept separated in data channels corresponding to those in the equalizer, and additional data channels are used to accumulate additional types of totals.

In order to permit recording of inforamtion collected over different periods of time, a plurality of storage or data accumulation channels, employing one or more loop storage systems, are provided. Another auxiliary channel, termed a "buffer" channel, is provided so that stored information can be transferred thereto for recording, while still permitting the data accumulation channels to continue functioning to receive and accumulate new signals.

In the output portion of the system means are provided for extracting information from the accumulator at desired times, and recording it. A typewriter or printer is convenient for recording, although other means could be employed. The speed of type-out in general is much slower than that at which accumulated totals circulate in the accumulator. Accordingly, the recording sequence is compared with the sequence in the accumulator, and coincidences thereof used to supply the accumulated totals to the output section for recording.

In order to obtain a high degree of reliability, several similar systems are provided for the equalization of input data and the accumulation thereof. Advantageously an odd number of systems are employed, three for example, and the accumulated data compared before it is recorded by the output section. In accordance with the invention, the comparison takes the form of a "voting" procedure whereby if two accumulated totals agree and the third does not, the first two prevail. Advantageously the voting is bit-by-bit of the totals, as will be described.

Provision is made to maintain proper synchonization between the various units in the complete system at all times.

The invention will be described in connection with an application thereof to a tin-plating line wherein the manifold requirements necessitate a fairly elaborate system. However, it will be understood that the invention may be applied to the accumulation of data in other types of manufacturing operations, and that portions of the system may be omitted where the requirements are less severe. The specific embodiments contains many additional features which will in part be pointed out, and in part be obvious, as the description proceeds.

In general, the drawings are arranged to proceed from the complete system to smaller and smaller portions thereof. Where blocks of a larger assembly are subsequently shown in more detail in a subsequent figure, that figure is indicated in the appropriate block. When blocks of one figure are shown on a subsequent figure for convenience of understanding, they are customarily shown dotted. Considerable legend has been employed to facilitate understanding.

For convenience, headings are employed in the following description, it being understood that due to interrelationships between units, the discussion under a given heading may not be complete.

Figure 1:
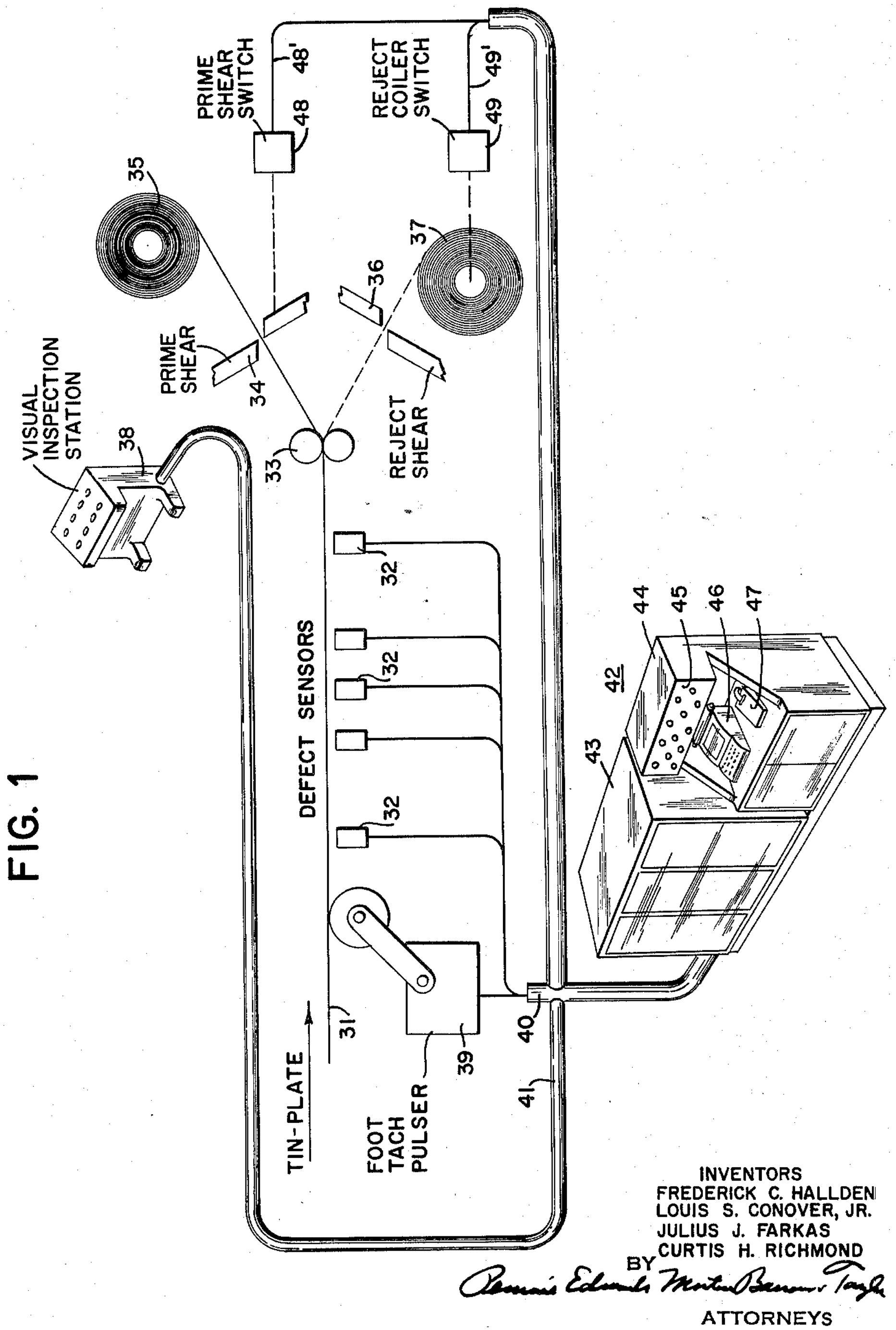
FIG. 1 is a diagrammatic view of an application of the invention to a tin-plating line.

Referring to FIG. 1, a strip 31 of tin-plate is shown moving past a plurality of defect sensors 32, through guide rollers 33 and prime shear 34 to reel 35. Customarily strip 31 will be continuous for long periods of time, individual strips being welded end to end as required. When a desired amount of strip has been coiled on reel 35, the prime shear 34 is actuated to sever the strip. Then another reel is placed in position, or an alternate take-up reel provided, and the strip is coiled thereon. If at any time the tin-plate is found to be so defective that it must be rejected, it is fed past a reject shear 36 to a reject reel 37 for reprocessing, etc.

Defect sensors 32 respond automatically to respective defects such as welds, pinholes, base metal heavy or light, top or bottom coating heavy or light, etc. Suitable sensors are known in the art and may be utilized in the present equipment.

There are also defects which are ascertained by observation, and to this end a visual inspection station 38 is provided. An operator sits at this station and watches the tin-plate line, usually near the shear point. Station 38 is provided with manually operated push buttons corresponding to various types of defects observed. A foot tach pulser 39 is provided which bears against the strip 31 and produces a pulse for each linear foot passing thereby.

Electrical connections extend from sensors 32, station 38 and pulser 39, via cables 40 and 41, to the data accumulation equipment generally designated as 42. This comprises a cabinet 43 for housing the major portions of the system, and a console having a switch panel 45 for inserting desired manual entries, a typewriter 46 for typing out the accumulated data as required, and a printer 47 used in the profile system.

A prime shear switch 48 is actuated by the prime shear 34 so as to provide a signal to the data accumulator for control purposes. Also, a reject coiler switch 49 is actuated by the rotation of reject reel 37 and supplies a corresponding signal to the data accumulator.

*Overall system*

As will be apparent hereinafter, the accumulation and processing of data involve a large number of components which may, upon occasion, become defective. Further, coding pulses are employed to accumulate and store the data. In many environments transients may exist due to the operation of other electrical equipment, and they may occasionally produce false operation. Accordingly, to secure a high degree of reliability, in the present embodiment three separate computers are employed which, ideally, give the same information. If, however, one computer gets out of step with the other two, either due to transients, defective operation, etc., the probabilities are that the other two will still be in step. Accordingly, the outputs of the three computers are compared as described hereinafter and a "vote" taken to determine what data should be used. Certain portions of the system, however, are not duplicated, either because it is impractical or is unnecessary for reliability.

Figure 2:
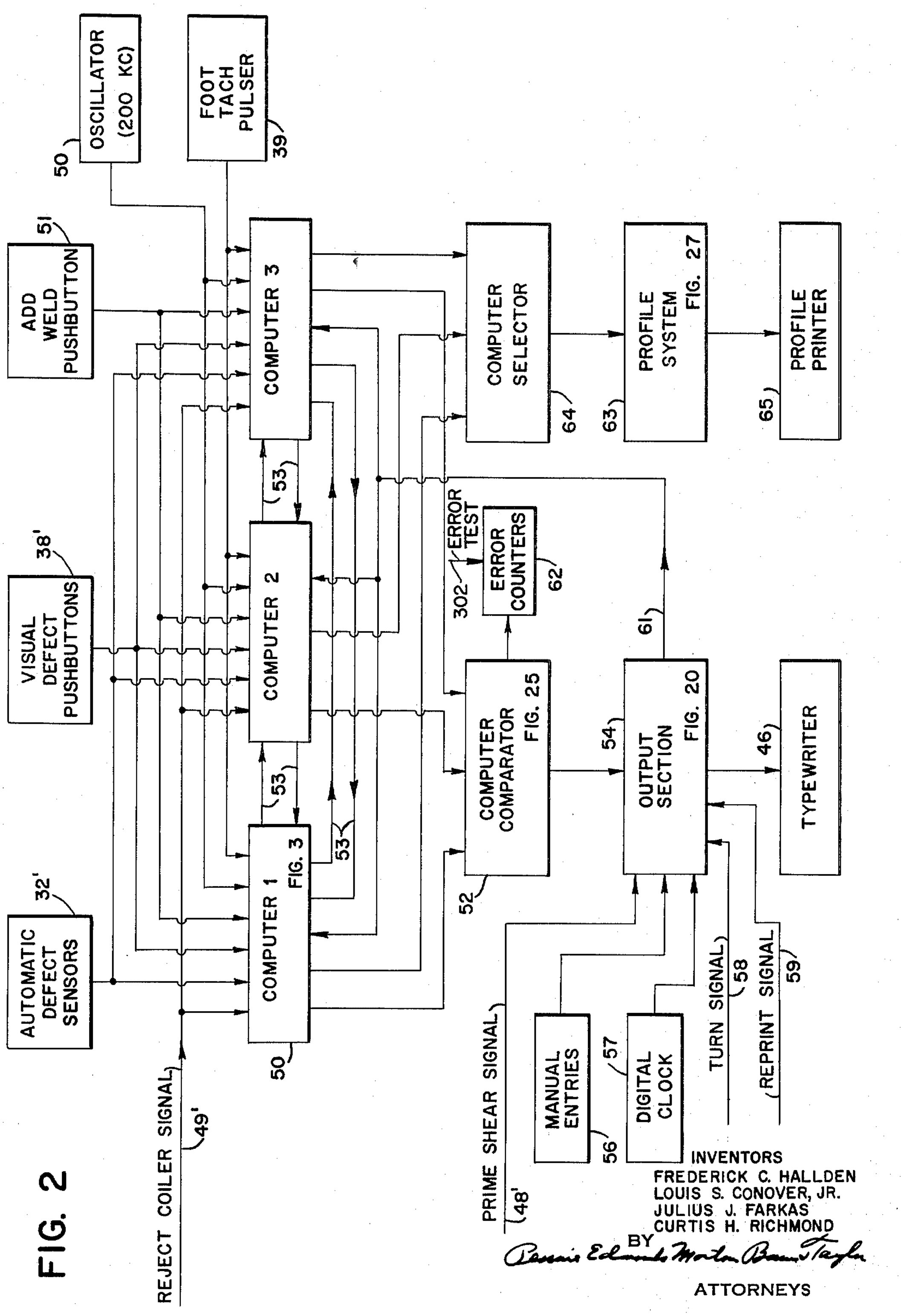
FIG. 2 is a block diagram of the overall system.

Referring to FIG. 2, three computers, denoted "Computer 1," "Computer 2" and "Computer 3" are fed in parallel with signals from the automatic defect sensors indicated by block 32′, signals from visual defect push buttons denoted 38′, and by signals from an add weld push button 51. Block 32′ corresponds to the sensors 32 of FIG. 1 and block 38′ designates the push buttons of the visual inspection station 38 of FIG. 1. A signal from the reject coiler switch 49 is supplied through line 49′ to the three computers, and also the signals from foot tach pulser 39.

In this embodiment the timing of all three computers is obtained by a single master oscillator 50 whose output is supplied to all computers. In the detailed embodiment, a 200 k.c. pulse wave is employed, as indicated in parentheses.

The outputs of the three computers are supplied to the computer comparator 52 for voting purposes. Interconnections 53 are provided between each pair of computers for synchronization purposes, as will be described hereinafter in connection with FIG. 26.

When the computer comparator has taken its vote, the selected output is supplied to output section 54 which controls the actuation of typewriter 46. In addition to the defect data, the output section also receives selected manual entries from 56 and digital clock signals from 57. A prime shear signal from switch 48 is supplied through line 48′ to the output section.

The output section is designed to type out data concerning each coil at the completion of that coil, and this is accomplished automatically by an actuating signal from the prime shear switch in line 48′. In this embodiment it is also desired to record for an eight-hour shift, called a "turn" herein, and this may be accomplished by an operator manually supplying a signal through line 58 to the output section. In the event the operator wants a reprint of data already typed out, he may supply a signal through line 59 to the output section.

The output section 54 is also interconnected with the three computers through line 61 for purposes hereinafter described in connection with FIG. 20. Comparator 52 is also arranged to supply signals to error counters 62 which total the number of errors made by each computer in a given length of time.

In this embodiment its is also desired to determine the types of defects occurring in given portions of a strip wound on a reel, and this is accomplished by profile system 63. This information is not required to be as accurate as the other data, so that the profile system 63 is supplied from only one of the three computers, as selected through switching in computer selector 64. The output of the profile system is recorded by a printer 65.

*Single computer*

Figure 3:
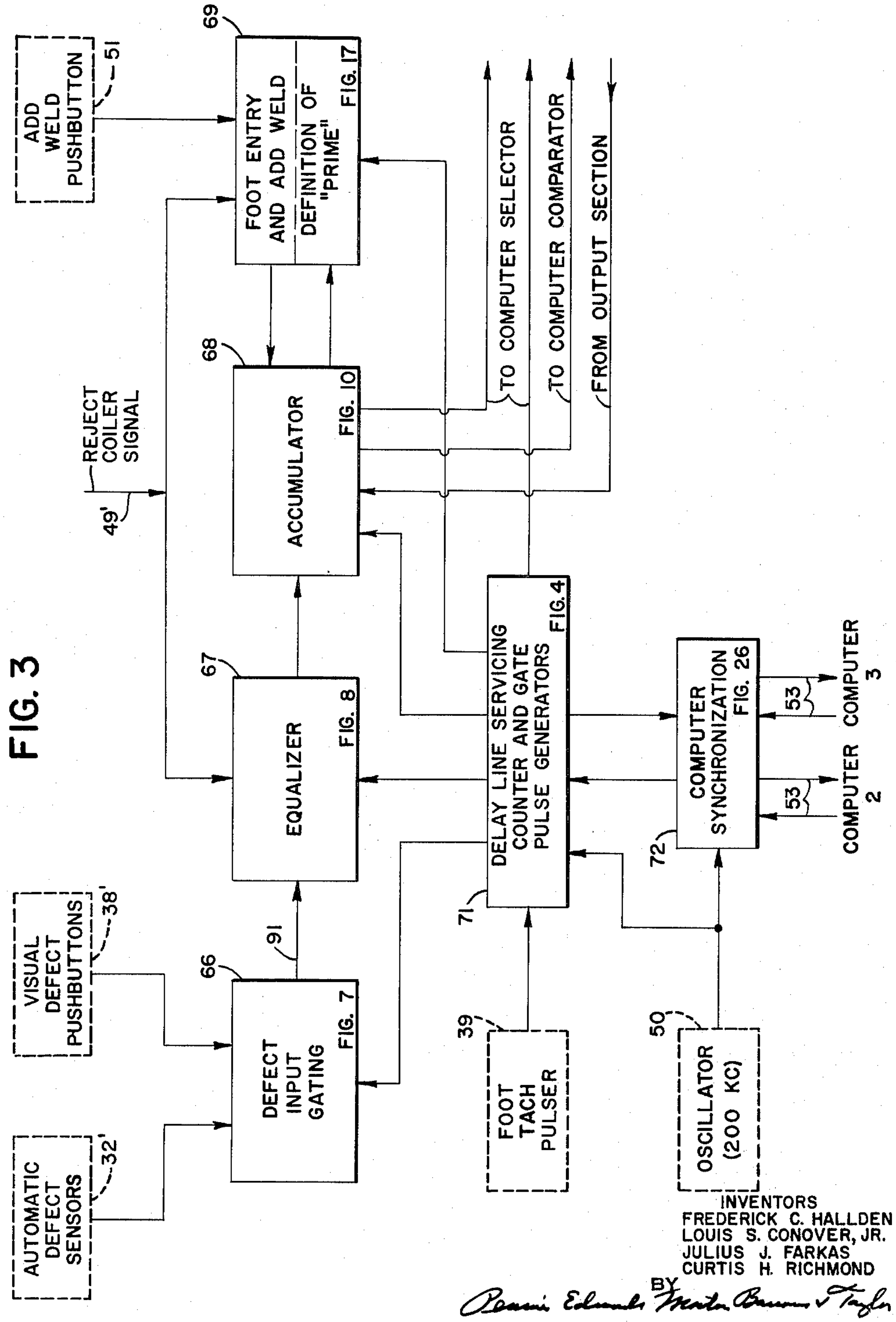
FIG. 3 is a block diagram of one of the computers of FIG. 2.

FIG. 3 shows computer 1 of FIG. 2. The outputs of the defect sensors and push buttons are supplied to a defect input gating unit 66 which gates the defeat signals successively in predetermined order and supplies the gated signals to equalized 67. The gating causes each defect signal to appear in the time channel assigned to that defect. However, as will be apparent from the spaced positions of sensors 32 (FIG. 1) along the line, the defect signals will be produced at different linear distances from the shear point. As will be explained more fully hereinafter, within each channel interval there are shorter time intervals or "slots" assigned to each linear foot from the shear point, termed "foot intervals." A defect is initially supplied to the equalizer in its proper channel, and in a foot interval corresponding to its distance from the shear point. These are termed the "channel address" and "initial foot address" of the defect.

Equalizer 67 functions to transfer a defect signal in its initial foot-address time slot to succeeding time slots as the strip 31 continues its movement until, when the last foot prior to the shear point is reached, a corresponding defect signal is delivered to accumulator 68.

The accumulator functions to count the defects as they occur, and store the resultant totals until it is time for the accumulated data to be typed out. The signal from add weld push button 51 is supplied to a Foot Entry and Add Weld unit 69, and the output thereof is suppled to accumulator 68 so that manual weld signals may be added to the automatic weld signals in totalizing. Interconnections between the accumulator and the foot entry portion of unit 69 allow totalizing overall footage, prime footage, secondary footage, etc. Unit 69 also contains circuits for defining "prime" strip material, since certain types of defects do not prevent the material from being classified as prime.

When reject strip is being wound on reject coil 37 (FIG. 1) it is unnecessary to accumulate defect data, although reject footage is desired. Accordingly, a signal from line 49' is fed to units 67 and 69 for control purposes.

Units 66–69 require various types of timing signals which are supplied thereto by generators in unit 71. This is also supplied with the signals from the foot tach pulser 39. The output of the master oscillator 50 is supplied to 71 for control purposes. A computer synchronization unit 72 functions to synchronize the operation of computer 1 of FIG. 3 with the operation of computers 2 and 3.

The output of accumulator 68 is supplied to the computer comparator 52 (FIG. 2), as explained before. The accumulator stores different types of information which can be withdrawn upon demand, under the control of signals thereto from the output section as indicated.

In the figures so far described, and in subsequent figures, single lines are usually employed to show interconnections between blocks. In many cases a large number of individual conductors may be required, as will be understood by those in the art.

*Servicing unit*

Figure 4:
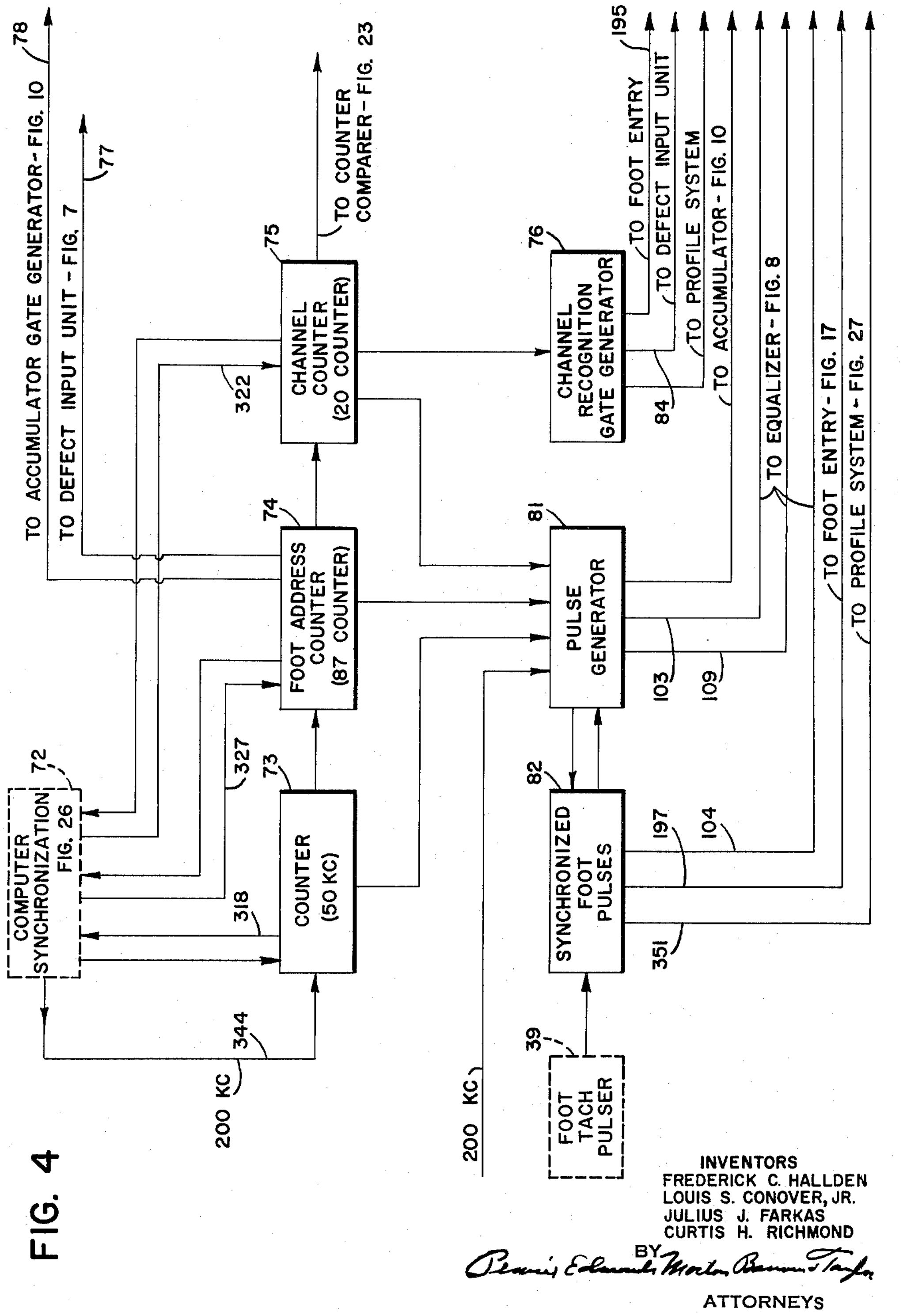
FIGS. 4–6 show a delay line servicing unit and waveforms explanatory thereof.
Figure 5:
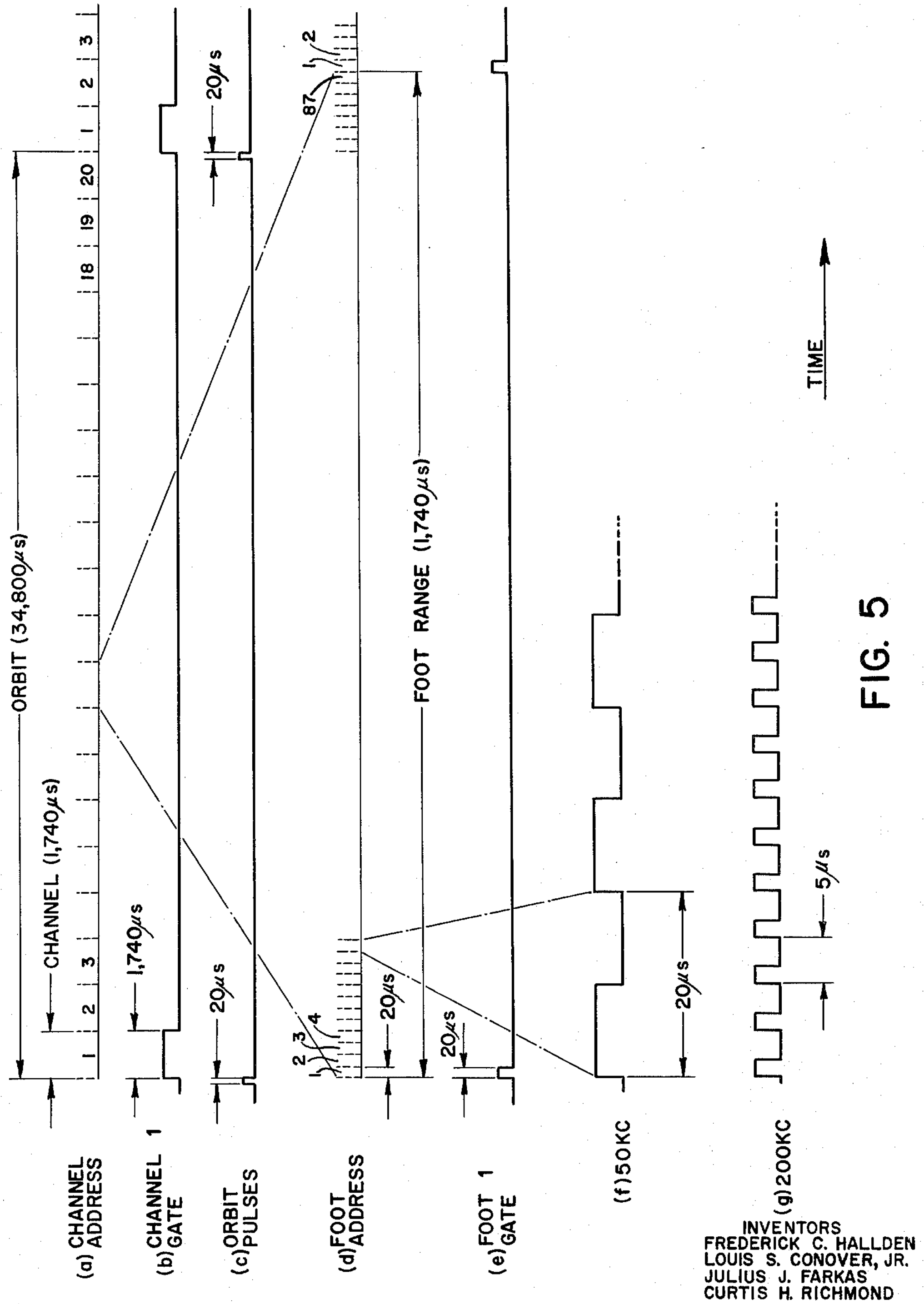

FIG. 4 shows the delay line servicing counter and gate pulse generators of block 71 in FIG. 3, and FIG. 5 gives explantory diagrams.

Referring first to FIG. 5, at (*a*) are shown a number of data channels occuring successively in time, sufficient to accommodate the number of defects and other types of data which it is desired to record. As specifically shown, there are twenty channels each of 1740 microseconds duration. These repeat continuously in an "orbit," which accordingly is 34,800 microseconds duration.

In this and succeeding portions of the specification, numerical figures will often be given to facilitate explanation. It will be understood that these figures are by way of example only, and the invention is in no wise confined thereto. They may vary widely, depending upon the requirements of the particular application.

In the present embodiment it was desired to accumulate data on a tin-plating line where the strip could move at speeds up to 1500 ft./min., or 25 ft./1 sec. At this maximum speed, one foot of travel corresponds to 40,000 microseconds. Accordingly, the orbit duration is somewhat less than this, so that defects in each foot of travel of the strip may be accumulated.

A Channel 1 gate is shown at (*b*) in FIG. 5. Gates for the other channels will be similar, but occurring during the respective channel shown in line (*a*). Orbit pulses are provided, as shown at (*c*), just preceding the beginning of Channel 1 of the orbit.

Inasmuch as the sensors are distributed along the tinplate line at various distances from the shear point, each channel is divided into a number of smaller time slots shown at (*d*). These are termed the "foot address." In this particular embodiment it was desired to provide for locations as far as 80 ft. or so from the shear point, and accordingly 87 foot-address intervals are shown. Each interval lasts for 20 microseconds. Gates are developed for each of the foot address intervals, and the Foot 1 gate is shown at (*e*). Twenty microsecond intervals correspond to one cycle of a 50 kc. wave, as shown at (*f*). This in turn corresponds to four cycles of a 200 kc. wave, as shown at (*g*).

FIG. 4 indicates the manner in which the various waveforms of FIG. 5 are developed. 200 kc. pulses from the computer synchronization unit 72 are delivered to a 50 kc. counter 73 (4:1 counter). The 50 kc. square wave output of 73 is supplied to a foot address counter 74 which counts successive cycles of the 50 kc. wave until eighty-seven counts have been reached, and then resets. The output of counter 74 is supplied to a channel counter 75 which counts up to 20 and then resets.

Counters 73 and 75 are binary counters which are well-known in the computer field. They contain the necessary number of stages for the counts involved, and the condition of the individual stages determines the then-existing count therein. The conditions of the several stages in a given counter may be combined by suitable matrices to obtain gates corresponding to each of the 20 channels and each of the 87 foot-addresses.

The conditions of the stages in channel counter 75 are supplied by the necessary number of individual conductors to the channel recognition gate generator 76 which generates individual channel gates 1 through 20 and supplies them to the foot entry, defect input and profile units, as indicated.

The conditions of the stages in the foot address counter 74 are supplied through line 77 to the defect input unit where they are utilized to form foot address gates. Counter 74 is also connected through line 78 to the accumulator gate generator for synchronization purposes.

The outputs of counters 73–75 are also supplied to pulse generator 81, along with the 200 kc. wave from the master oscillator. The types of pulses generated in 81 will be described as they are utilized in subsequent figures.

The development of timing and control waves such as timing pulses, gates, etc. is well understood in the computer field, so that detailed description is unnecessary.

It is desired to count defects only once for each foot of travel of the tin-plate strip. Inasmuch as the orbit is shorter than the time it takes for one foot of travel, and is not synchronized with the movement of the strip, synchronized foot pulses are generated in unit 82, as will be explained by reference to FIG. 6.

Figure 6:
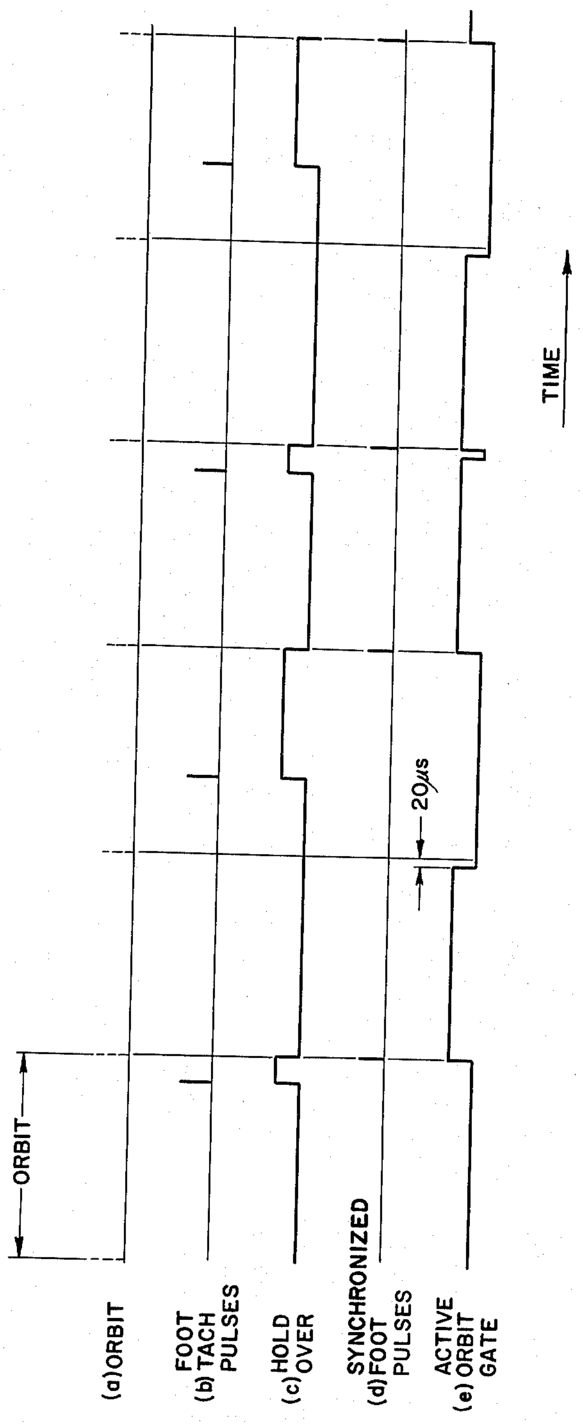

FIG. 6 shows repetitive orbit cycles at (*a*). Foot tach pulses from pulser 39 are shown at (*b*) for a speed of travel near maximum. These pulses are applied to unit 82, which holds over each foot tach pulse until the next orbit pulse arrives, as shown at (C). The holdover may be effected by using a bistable multivibrator which is set by a foot tach pulse and reset by the next orbit pulse. To guard against adverse effects when tach and orbit pulses substantially coincide, the multivibrator may be inhibited from reset for a short interval after it is set. Pulses are produced at the trailing edge of the hold-over pulses to form synchronized foot pulses, as shown at (*d*). This may be accomplished by differentiation.

As will be explained in connection with FIGS. 8 and 9, defect pulses circulating in the loop storage unit are moved from one foot interval to the next for each foot of travel of the strip, on the average. This is accomplished during "active" orbits. An active orbit gate is generated in 81, as shown at (*e*) of FIG. 6. This starts with a synchronized foot pulse and terminates just short of the next orbit pulse, a 20-microsecond interval being here employed. This interval may be produced by utilizing the 87th foot gate immediately preceding the end of the 20th channel gate.

*Defect input gating*

Figure 7:
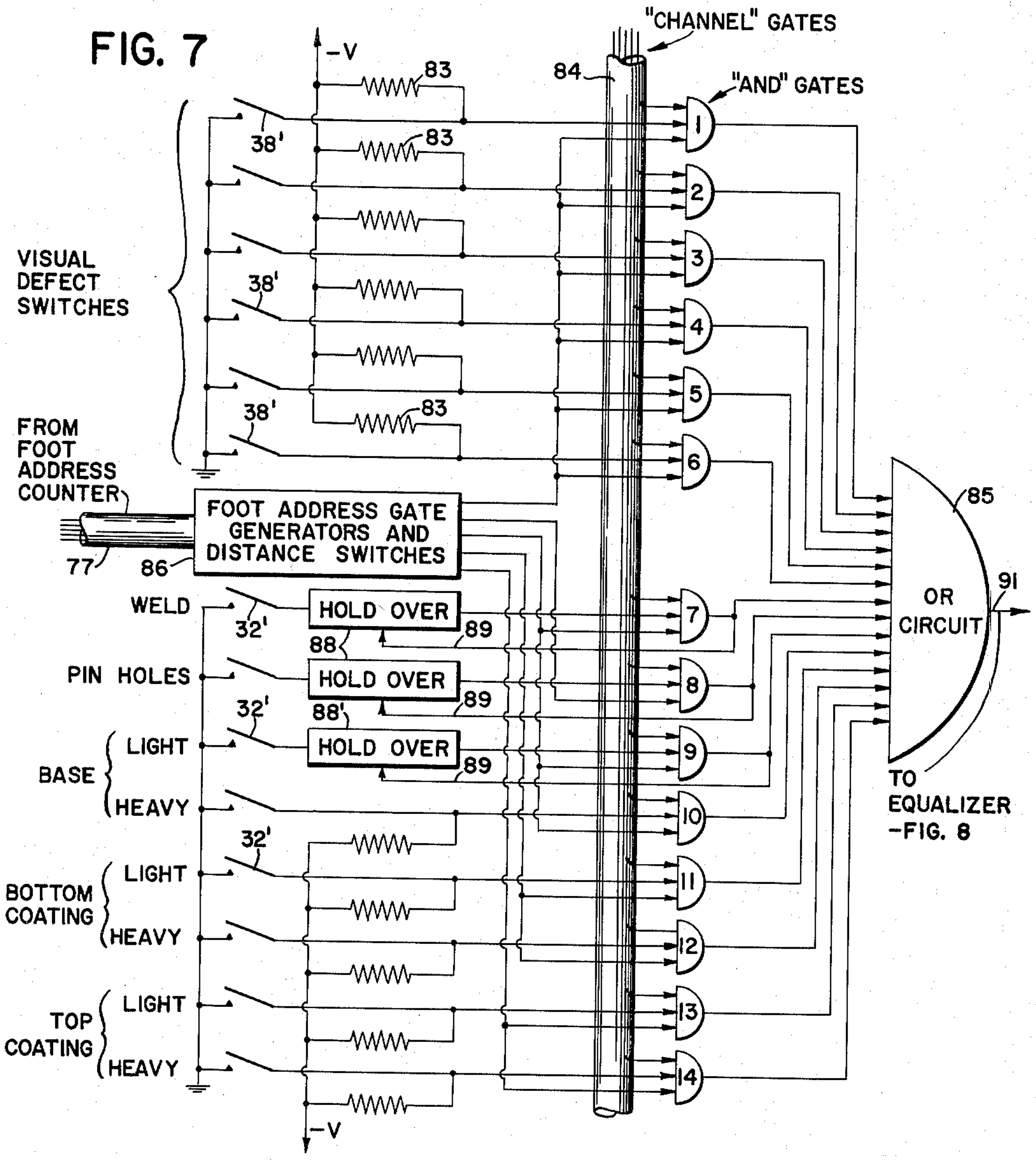
FIG. 7 shows a defect input gating unit.

FIG. 7 shows the defect input gating unit 66 of FIG. 3. Its overall function is, upon arrival of a defect signal, to produce a corresponding pulse in the channel assigned to that defect, and in an initial foot interval corresponding to the distance from the shear point to the sensor or point of visual inspection.

This figure introduces semicircular symbols designated "AND" gates and "OR" circuit, and subsequent figures will frequently use the symbols with "AND," "OR" or "NOT" therein. These are conventional components well known in the computer field. Summarizing their functioning at this point, an "AND" gate or circuit gives an output only when all inputs are present. An "OR" circuit gives an output when any one or all input signals are present. In both cases, as the circuits are here used, the output polarity is the inverse of the input polarity. A "NOT" circuit is essentially an inverter, that is, a pulse input of one polarity will give a pulse output of the opposite polarity.

Returning to FIG. 7, at the upper left, six switches are shown which are the visual defect push button switches 38′. These are connected to respective input circuits of AND 1 through 6, thus permitting six types of visual defects to be separately accumulated if desired. The AND input circuits are normally held negative by a source denoted —V, through resistors 83, thus maintaining the gates closed until the corresponding switch is actuated to bring the input circuit to ground. Channel gates are supplied to AND 1–6 through corresponding conductors in line 84 from the channel recognition gate generator 76 (FIG. 4). Thus, AND 1–6 are opened in succession during respective channel intervals, and defect signals can pass therethrough to OR 85 only during the channel intervals assigned thereto.

Foot address gates are also supplied to AND 1–6 from gate generator 86. This receives status signals from the foot address 87-counter 74 (FIG. 4) through conductors in line 77. If visual defects are observed near the shear point, an initial foot address of 2, 3, 4, etc. may be assigned thereto and the corresponding foot interval gate supplied to AND 1–6. Usually visual defects cannot be located within a given foot of the strip, since the strip travels very fast and an operator cannot react quickly enough. Also, commonly, visual defects are large area defects applying to a considerable number of feet. Consequently, the initial foot address assigned to the defects is not critical. If the point of visual inspection is at some distance from the shear point, an initial foot address gate may be utilized which corresponds to that position.

At the lower left are shown eight switches 32′ which are the automatic sensor switches. Legend indicates the particular defect corresponding to each switch. Certain types of defects such as pinholes are likely to be small area defects, whereas other types such as a heavy base material or variations in coating thickness are likely to extend over more than one foot of the strip.

Since the time of occurrence of a small area defect signal may not coincide with the time of occurrence of the channel and initial foot address assigned thereto, hold-over circuits 88, 88′ are provided for the upper three sensor switches. Once the switch is closed, the hold-over circuit continues to apply an input signal to the corresponding AND 7, 8 or 9 until it is reset by a signal from the output of the AND circuit through one of lines 89. The normal condition of the hold-over circuits is to keep respective AND gates closed until the corresponding sensor switch is actuated.

The remaining five switches are connected to AND gates 10–14 in the same manner as the visual defect switches.

Channel gate signals from line 84 are supplied to the inputs of AND gates 7–14 to confine their opening to the channels assigned thereto. Suitable initial foot address gates are supplied thereto from generator 86 corresponding to the distances of the several sensors from the shear point. For a given installation the sensor positions will be known, and fixed matrices may be employed in 86 for generating the proper initial foot address gates. However, for flexibility, distance switches may be provided in 86 so that the signals from the 87-counter may be recombined as desired to provide adjustable initial foot addresses for the sensors.

As specifically shown here, the weld, base light and base heavy sensors are located at the same point, so that a single initial foot address gate suffices for gates 7, 9 and 10. The bottom coating measurements are also made at the same point, and the same initial foot address signal is applied to gates 11 and 12. The same is true for the top coating, and the same initial foot address signal is applied to gates 13 and 14.

The OR circuit 85 gives an output for an input in any of the lines from AND gates 1 through 14. Thus, when any defect is visually or automatically detected, a corresponding pulse occurs in output line 91 at the proper channel and initial foot address. These outputs are supplied to the equalizer of FIG. 8.

One further factor concerning defect entry requires discussion. Pinhole defects are very small and welds are commonly less than a foot in length. Thus, only one count is required and an A.-C. input to the corresponding hold-over circuit 88 suffices. However, a "base light" defect may be less than a foot, or considerably more, depending upon the cause. Inasmuch as holdover circuit 88′ is reset by a signal of the proper address in the output of AND 9, it is desirable to set the holdover circuit again if the corresponding switch remains closed, so as to deliver additional output pulses if the defect continues.

Figure 7A:
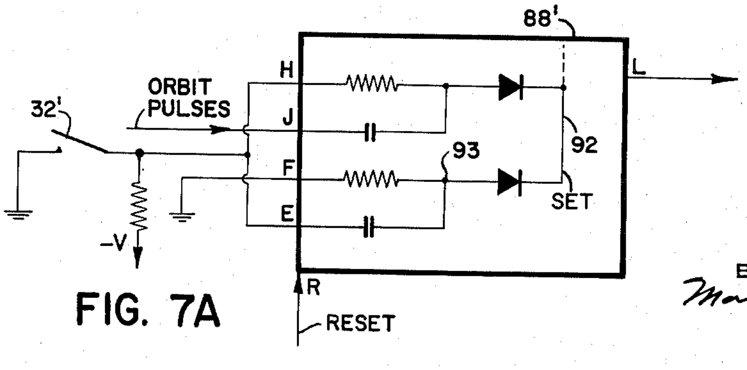
FIG. 7A is a detail applicable thereto.
Figure 13A:
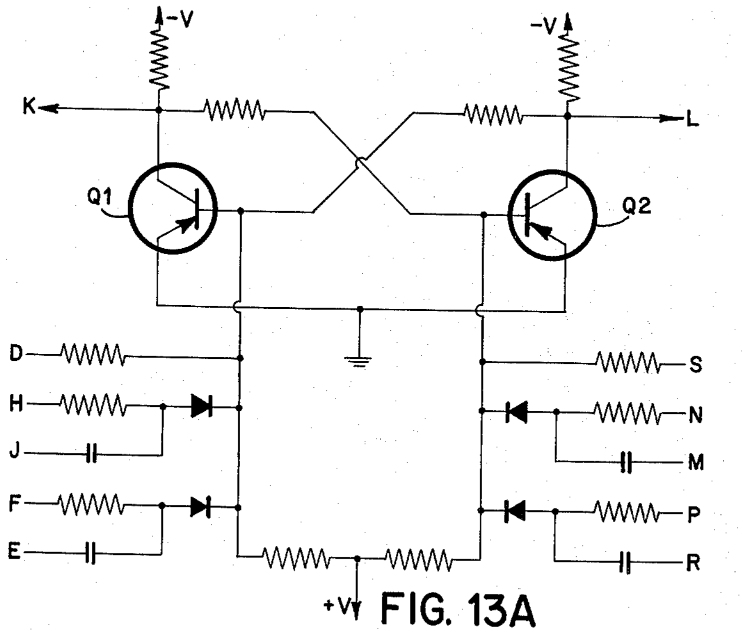
FIGS. 13A and 13B illustrate a typical multivibrator (FF) unit and a schematic representation thereof.

Referring to FIG. 7A, a suitable holdover circuit for this purpose is shown. This is part of a multivibrator or flip-flop circuit which is shown in FIG. 13A, but only a portion need be described at the moment. The set line 92 is normally slightly negative to ground, and setting is accomplished by applying a positive pulse thereto. Due to the action of the diode in input F, point 93 is normally at the potential of line 92 and the capacitor in input E is charged to —V. Thus, when the sensor switch 32′ closes, point E is brought to ground and delivers a positive-going pulse to 93 which sets the flip-flop. Reset occurs by a signal applied to R, which need not be described at this time. However, closing of switch 32′ grounds H so that a subsequent orbit pulse applied to J again sets the flip-flop. This action repeats for each orbit pulse so long as switch 32′ remains closed. Consequently, the holdover circuit 88′ will respond to a short defect through input E, and will give repeated responses to long defects through input J. The —V potential at H prevents orbit pulses from setting the flip-flop when the switch is open.

From the above discussion of FIG. 7, it will be noted that if the tin-plate strip is traveling slowly, a number of orbits will occur for a given foot of travel, and a number of output pulses in line 91 may occur for the same type of defect in a given foot of travel. In this particular embodiment it is unnecessary to count the number of defects of a given type which occur within a given foot. Rather, it is desired to count the number of feet in which a given type of defect occurs. Thus, only one defect signal of a given type is utilized for a given foot of travel, even though a number of such defects (such as pin-holes) may occur in that foot. This is taken care of in the operation of the equalizer, which will now be described.

*Equalization*

The equalizer is a loop storage system in which defect pulses are recirculated synchronously with the orbit cycle. During non-active orbits the recirculation interval is equal to that of the orbit, so that defect pulses in a particular channel and foot interval maintain that relationship. However, when a synchronized foot pulse is produced, thereby producing an active orbit, all the circulating pulses are advanced or delayed by a foot interval, depending on the order selected for the foot-intervals in the channels. In this embodiment circulating pulses are advanced during an active orbit. When a given defect pulse reaches the foot 1 interval, it is withdrawn from circulation and passed to the accumulator, since at that time the portion of the strip in which the defect appears is at the shear point.

Various forms of circulating loop storage systems may be employed as meets the requirements of a particular application. In this embodiment an ultrasonic delay line is employed.

Figure 8:
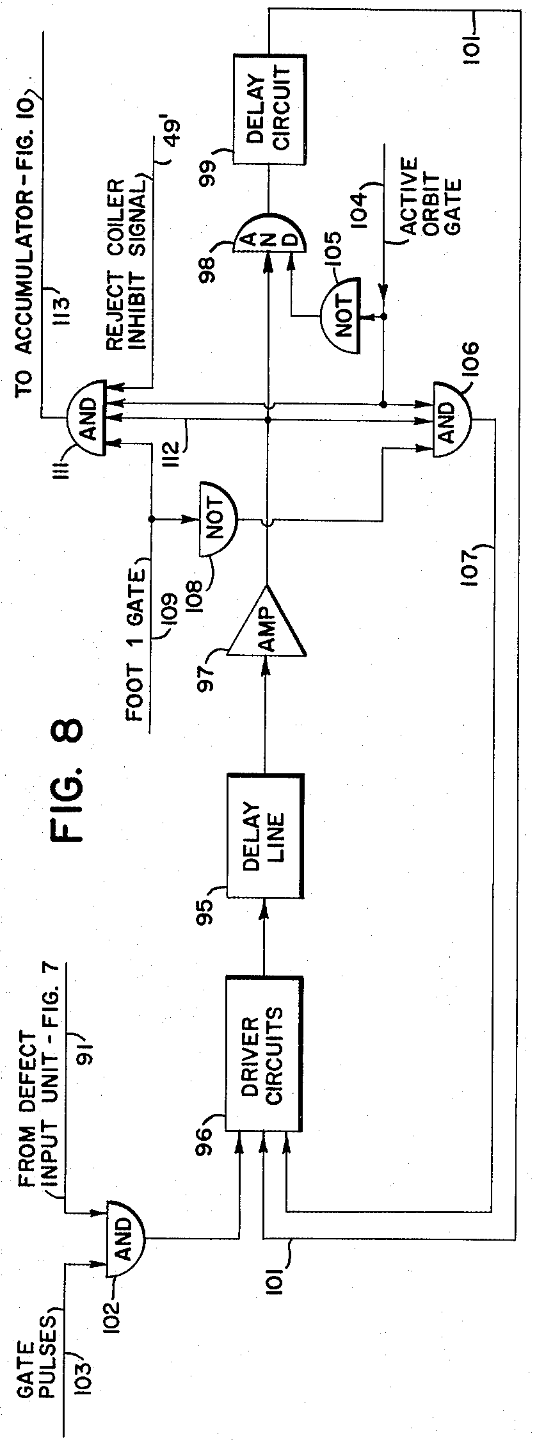
FIGS. 8 and 9 show an equalizing unit and explanatory waveform therefor.

Referring to FIG. 8, the ultrasonic delay line is shown at 95 with suitable driver circuits 96 and an amplifier 97. During a non-active orbit, pulses are recirculated through the outer path including AND 98, delay circuit 99 and line 101. The total delay in this outer path is selected to equal the orbit interval, which in this case is 34,800 microseconds.

Input defect signals from line 91 are supplied through AND 102 to the driver 96. In order to provide a margin of safety between pulses in adjacent foot intervals, gate pulses recurring at 50 kc. and shorter than the foot gate pulses are supplied from pulse generator 81 (FIG. 4) through line 103 to AND 102. These are shown at (*b*) of FIG. 9.

During an active orbit, the active orbit gate shown at (*e*) of FIG. 6 is supplied through line 104 to NOT 105 to close AND 98 and thereby prevent pulses from criculating through the outer loop. The active orbit gate is also supplied to AND 106 to activate the inner circulating loop including line 107, and to activate output AND 111. The foot 1 gate applied through NOT 108 to AND 106 may be disregarded for the moment.

Delay circuit 99 provides a delay equal to a foot interval (20 microseconds) and consequently, when it is eliminated, the pulses circulating through inner loop 107 are advanced by 20 microseconds with respect to their previous position within the orbit. Delay circuit 99 could be a passive delay circuit of the ultrasonic or other type, but is conveniently a flip-flop set and reset to provide the proper delay.

When a foot 1 gate occurs at the beginning of each channel, it is supplied through line 109 and NOT 108 to AND 106, thereby closing the inner loop 107. The foot 1 gate is also supplied to AND 111 to allow a defect signal in the foot 1 interval to pass from line 112 to the output line 113. A reject coiler inhibit signal from line 49' (FIG. 3) is supplied to AND 111 so as to prevent passage of defect pulses to line 113 if the corresponding portion of the strip is being rejected.

Figure 9:
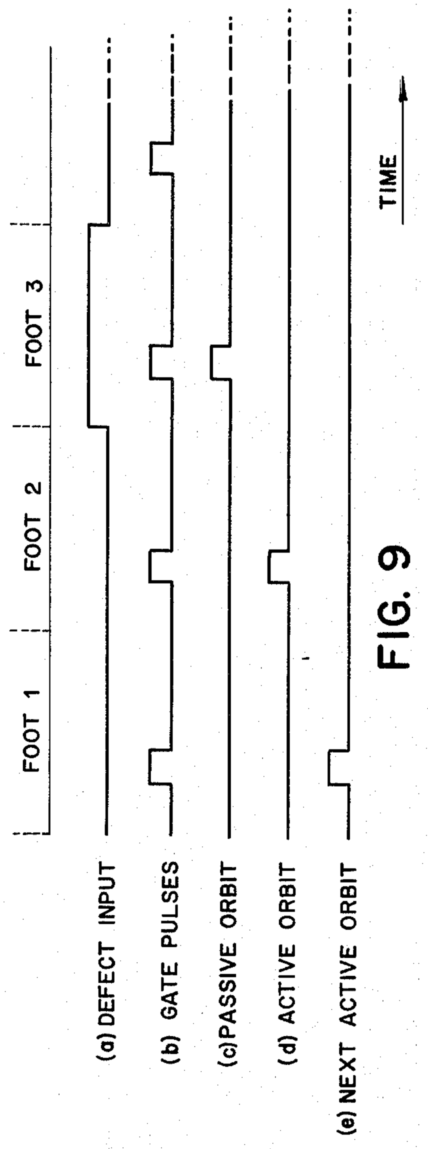

FIG. 9 illustrates the overall operation. Suppose that a defect input as shown at (*a*) is produced during the foot 3 interval of a given channel, as by actuation of a visual defect switch in FIG. 7. This will be supplied to AND 102 along with the gate pulses shown at (*b*). Thus, the corresponding pulse supplied to driver circuits 96 is as shown at (*c*). This will recirculate during passive orbits around the outer loop 101 and will continue to recur in the foot 3 interval of the same channel. However, when an active orbit occurs, the pulse will be advanced 20 microseconds and will then fall in the foot 2 time interval, as shown at (*d*). During succeeding passive orbits it will remain in the foot 2 interval. When the next active orbit occurs, it will be further advanced to the foot 1 interval, as shown at (*e*), and will pass out of the circulating loop to line 113.

Summarizing the foregoing operation, it will be seen that as defects are detected either visually or automatically at any point along the path of travel of the tin-plate strip, the defect signals will be supplied to the loop storage system in their proper channel and initial foot addresses. That is, each defect will be entered in the channel interval corresponding to that type of defect, and in the foot interval within that channel corresponding to the distance from the shear point that the defect is detected. Once admitted to the loop storage system, the defect signals will be continuously recirculated as the strip moves toward the shear point, and for each foot of travel the stored signals will be advanced by a foot interval until they reach the foot 1 interval. Then they exit from the loop storage system. At the time a given defect signal exits, the portion of the strip containing that defect will have reached the shear point. If more than one type of defect is present in the portion of the strip at the shear point, more than one defect signal will pass out of the loop storage system during an orbit, but they will occur successively in the channels corresponding to those defects.

If more than one input defect signal of the same type occurs in successive passive orbits, it will have the same address as the preceding signal and consequently will have no effect. However, as soon as the signal has been shifted to the next foot interval during an active orbit, the initial foot address is available for another defect signal in the next foot of strip.

It may be pointed out that when the strip is moving very rapidly, so that the time for moving one linear foot approaches that of an orbit, the defect pulses passing out of line 113 of FIG. 8 may not correspond strictly to a particular foot of the strip at the shear point. The lower the speed with respect to an orbit, the closer will be the correspondence. This functioning meets the requirements of the particular application.

*Accumulation*

The equalized defect signals now require accumulation. Before the detailed circuitry for accomplishing this is described, the requirements for this particular application and the general manner in which they are met will be discussed.

It was desired to accumulate each type of defect coil by coil and also for a turn (eight-hour shift). This involves the accumulation of fourteen types of defects in this embodiment. It was also desired to accumulate information as to total number of feet, number of prime and secondary feet and number of reject feet, thus requiring separate totalization of 18 quantities for coils and for a turn. A capability of totalling in six digits was desired. It was further desired to be able to print out the totals promptly upon demand. Thus, upon completion of a coil, the information concerning that coil was to be recorded immediately so a tag could be attached thereto.

Due to the high operating speeds, fairly rapid accumulation was required, thus indicating electronic counting. While it would be possible to provide separate counters for each type of defect, and two sets of counters for coil and turn, the resultant duplication was considered unduly expensive.

Accordingly, in the accumulator used in this embodiment, a circulating loop storage system is employed, and the defect totals represented by pulses in accordance with a binary code. These totals are accumulated channel-by-channel, and the coded total in each channel increased as successive defect signals arrive in that channel. Separate totals for each defect are produced for coil and turn totals.

Since the winding of a coil commences very quickly after the shearing of the preceding coil, and there may be insufficient time for typing out all the desired data, it is desirable to arrange for the accumulation of data on the new coil while the type-out for the preceding coil is taking place. Accordingly, a buffer channel is provided in the accumulator to which either the coil or turn totals can be transferred for type-out. During the transfer, new data can be accumulated.

Concerning the time requirements, four pulse bits in a binary code suffice for a decimal place, resulting in 24 bits for six decimal places. For three accumulator channels (coil, turn and buffer), seventy-two bits are required for each of the twenty data channels, totaling 1440 bits. Assuming 20-microsecond intervals, 28,800 microseconds suffice. This is somewhat less than the duration of the orbit cycle in the equalizer, but for ease of construction and maintenance, a similar loop storage system with an orbit cycle of the same duration is employed in the accumulator. For other requirements, it may be desirable to employ shorter (or longer) orbit cycles in the accumulator.

It would be possible to assign one-third of an accumulator orbit for each of the coil, turn and buffer totals. However, since information comes from the equalizer channel-by-channel, this poses storage problems in transferring defect information to the accumulator channels. Thus, in the present embodiment, interleaving of coil, turn and buffer intervals is employed. If the interleaving were accomplished channel-by-channel, considerable storage would be required in transferring totals from coil or turn to buffer.

Accordingly, in the present embodiment the coil, turn and buffer totals are interleaved bit-by-bit. This not only effectively utilizes the accumulator loop storage system, but also greatly facilitates transfer of data to the buffer.

Figure 10:
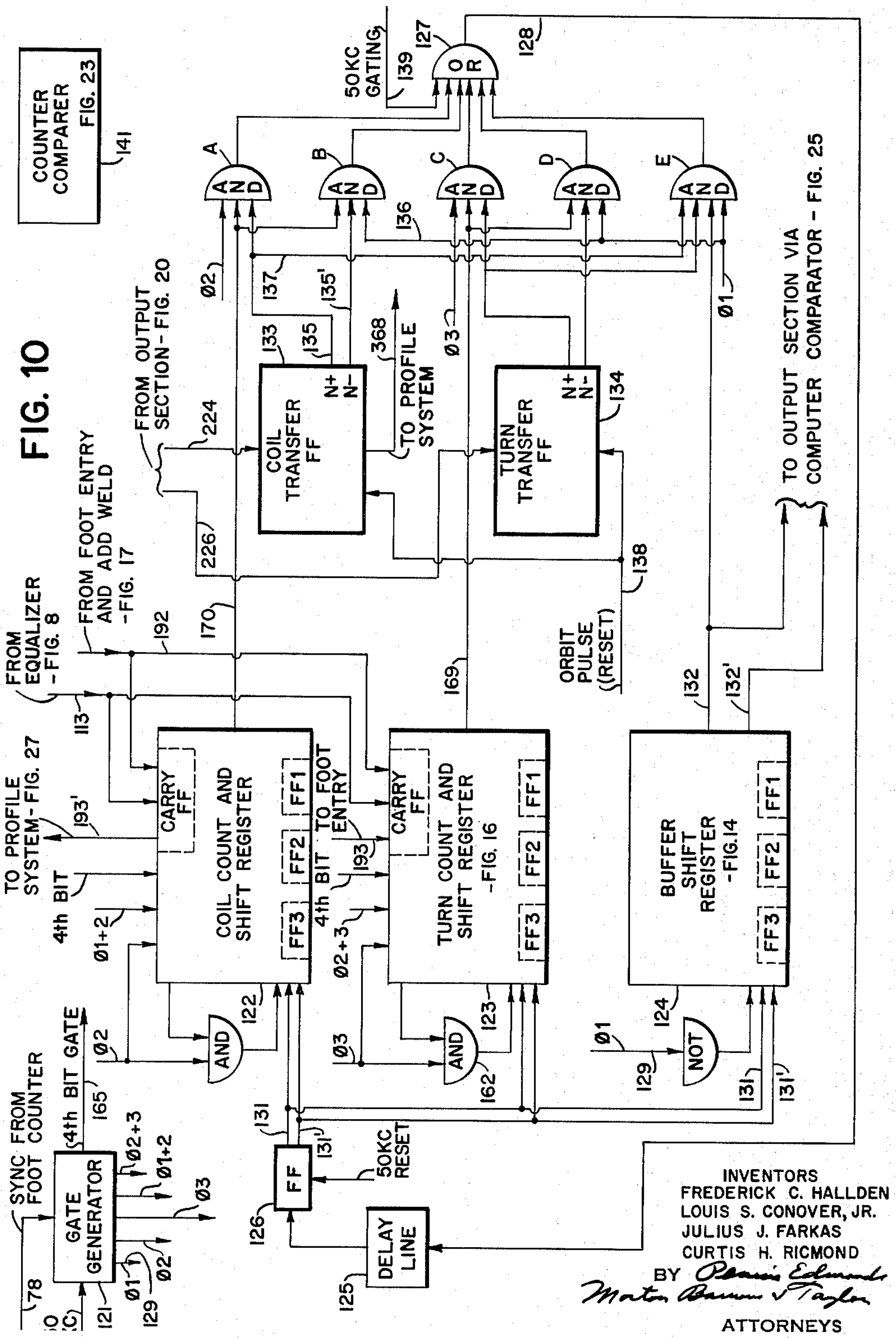
FIGS. 10–12 show an accumulator unit, a binary code utilized therein and waveforms explanatory thereof.
Figure 12:
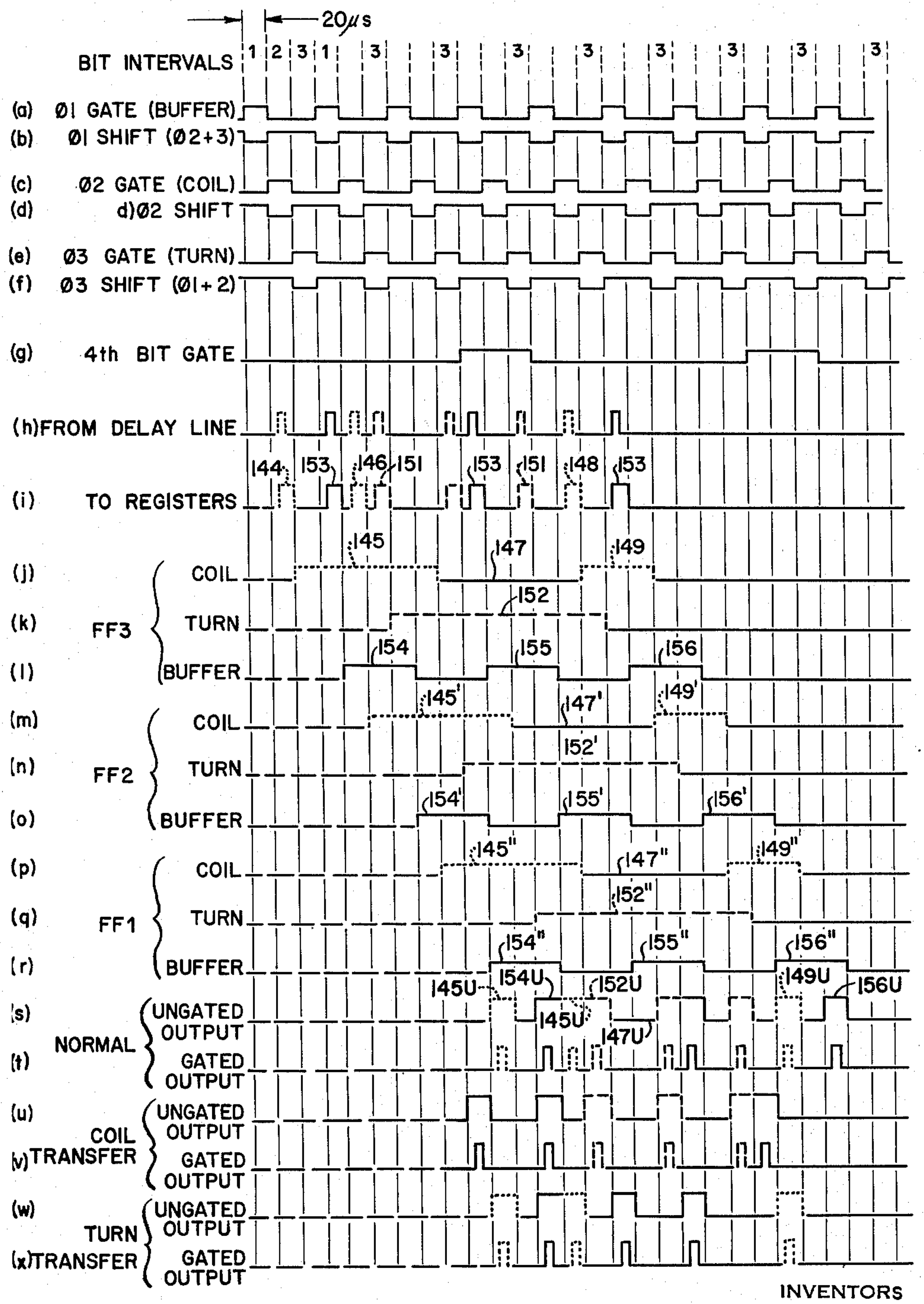

Referring now to the accumulator of FIG. 10, and the explanatory waveforms of FIG. 12, the interleaved accumulator channels are denoted $\phi 1$ for the buffer, $\phi 2$ for the coil, and $\phi 3$ for the turn totals. FIG. 12 shows the bit intervals at the top. They are denoted 1, 2, 3, 1 . . . in accordance with the respective phases, and each bit interval is 20 microseconds long. $\phi 1$, $\phi 2$ and $\phi 3$ gate waves are also shown, and they alternate in regular sequence. Corresponding phase shift waves are shown beneath respective gate waves, and are the inverse thereof. These waveforms are produced by a gate generator 121 which is supplied with 50 kc. pulses from generator 81 in FIG. 4. Other waveforms are also generated in 121, as will be described later.

The coil, turn and buffer channels include corresponding registers 122, 123, 124 supplied with input coded pulses from delay line 125 through FF126. FF126 is a bistable multi-vibrator or "flip-flop" which is well known in the computer field. Since many of these circuits will appear in this and subsequent drawings, the designation "FF" is employed for brevity.

The outputs of register 122 may be supplied through either AND A or AND B to OR 127. The output of register 123 may be supplied through either AND C or AND D to OR 127. The output of register 124 may be supplied through AND E to OR 127. The output of OR 127 is connected through line 128 to the delay line 125. It is therefore seen that the registers 122–124 are each included in the loop storage system including delay line 125, so that corresponding coded pulses can be recirculated therethrough. Suitable control is provided to keep the coded pulses in proper sequence, as will be described.

For convenience of explanation, it will first be assumed that coded defect totals have already been introduced and are being recirculated. Later the manner of introducing the information will be described.

Considering first the buffer channel, an output pulse from delay line 125 sets FF126, and the latter is reset shortly thereafter by 50 kc. pulses. It is convenient to employ pulse durations in the delay line which are shorter than those to be utilized in the registers, and the setting and resetting of FF126 stretches the pulses to a suitable length which is here approximately 12 microseconds.

Referring to FIG. 12, at (*h*) are shown representative pulses issuing from delay line 125. The full line pulses correspond to the buffer phase 1, the dotted line pulses to the coil phase 2, and the dash pulses to the turn phase 3. These begin at some point in the respective bit interval and are stretched by FF126 to form longer pulses, as shown at (*i*). Each pulse terminates at the end of its respective bit interval. The outputs of FF126 are of opposite polarity in lines 131 and 131', that for line 131 being shown at (*i*) in FIG. 12.

Although pulses of all three phases are fed from FF126 to the buffer shift register 124, only those in phase 1 are effective, due to the application of the $\phi 1$ gate thereto through line 129. Shift register 124 contains three FF units denoted FF3, FF2 and FF1. Pulses applied to the input of the register through lines 131, 131' are effective only when they occur simultaneously with the $\phi 1$ gate in line 129. Thus only pulses in phase 1 are fed into FF3 in the register. The next $\phi 1$ gate will cause FF2 to assume the previous status of FF3 and simultaneously a new pulse, if present, will be introduced into FF3. The next $\phi 1$ pulse causes FF1 to assume the previous status of FF2, etc. The detailed operation of the shift register will be described hereinafter in connection wtih FIG. 14.

The overall operation is to transfer buffer pulse bits successively through the stages of the shift register until they issue therefrom at lines 132, 132'. These pulses are supplied through output lines to the output section (FIG. 20) via the computer comparator (FIG. 25).

The output pulses in line 132 are also supplied to AND E. A $\phi 1$ gate is supplied to AND E, and the other two inputs are plus during normal recirculation in the buffer channels, so that each buffer pulse in line 132 (assumed to be positive) issues from AND E with inverted polarity and passes through OR 127 which again inverts the polarity. Consequently positive pulses appear in line 128 corresponding to those in line 132, and are reintroduced into delay line 125.

Coil register 122 operates during phase 2. It includes the shift functions of buffer register 124 and in addition increases the coded coil total by one upon the occurrence of a defect. Defect signals are applied thereto from the equalizer through line 113. This functioning of coil register 122 will be described later. In the absence of new defects, the previously stored coil total in phase 2 will be supplied to AND A and AND B through line 170.

A coil transfer FF133 has outputs which are normally plus and minus, as indicated. Thus AND A will supply an output to OR 127 upon the simultaneous occurrence of a pulse from register 122 and the $\phi 2$ gate. These will be recirculated through line 128 and delay line 125, as previously described.

The turn channel including register 123 is similar to the coil channel. Turn transfer FF134 normally supplies a positive output to AND C which is also gated with the $\phi 3$ waves. Accordingly, turn total pulses will be supplied from AND C to OR 127 and thence to delay line 125 for recirculation.

When it is desired to type out a coil total, coil transfer FF133 is actuated to its opposite condition for one orbit. This reverses the polarities of its output lines 135, 135', thereby closing AND A and allowing AND B to open during the occurrence of the $\phi 1$ gate supplied thereto through line 136. Accordingly, the coil pulses previously pasisng through AND A in phase 2 will now pass through AND B in phase 1 and will issue from OR 127 and pass into delay line 125 in phase 1. Hence the coil total will thereafter recirculate in the buffer phase.

Upon termination of the transfer orbit, FF133 reverts to its normal condition as shown, thereby closing AND B and allowing AND A to function in phase 2. Thus, the coil channel is available for accumulating new defect data from the succeeding coil.

When coil data is transferred to the buffer, any information previously circulating in the buffer is eliminated. This is accomplished by connecting output line 135 of FF133 through line 137 to AND E. During a coil transfer, this line will be negative and will close AND E, thereby preventing pulses issuing from the buffer register from being recirculated.

In a similar manner, when it is desired to transfer turn information to the buffer phase, turn transfer FF134 closes AND C and allows AND D to open during phase 1, so that pulses from the turn register 123 pass through AND D in phase 1 and are recirculated in the buffer.

Figure 20:
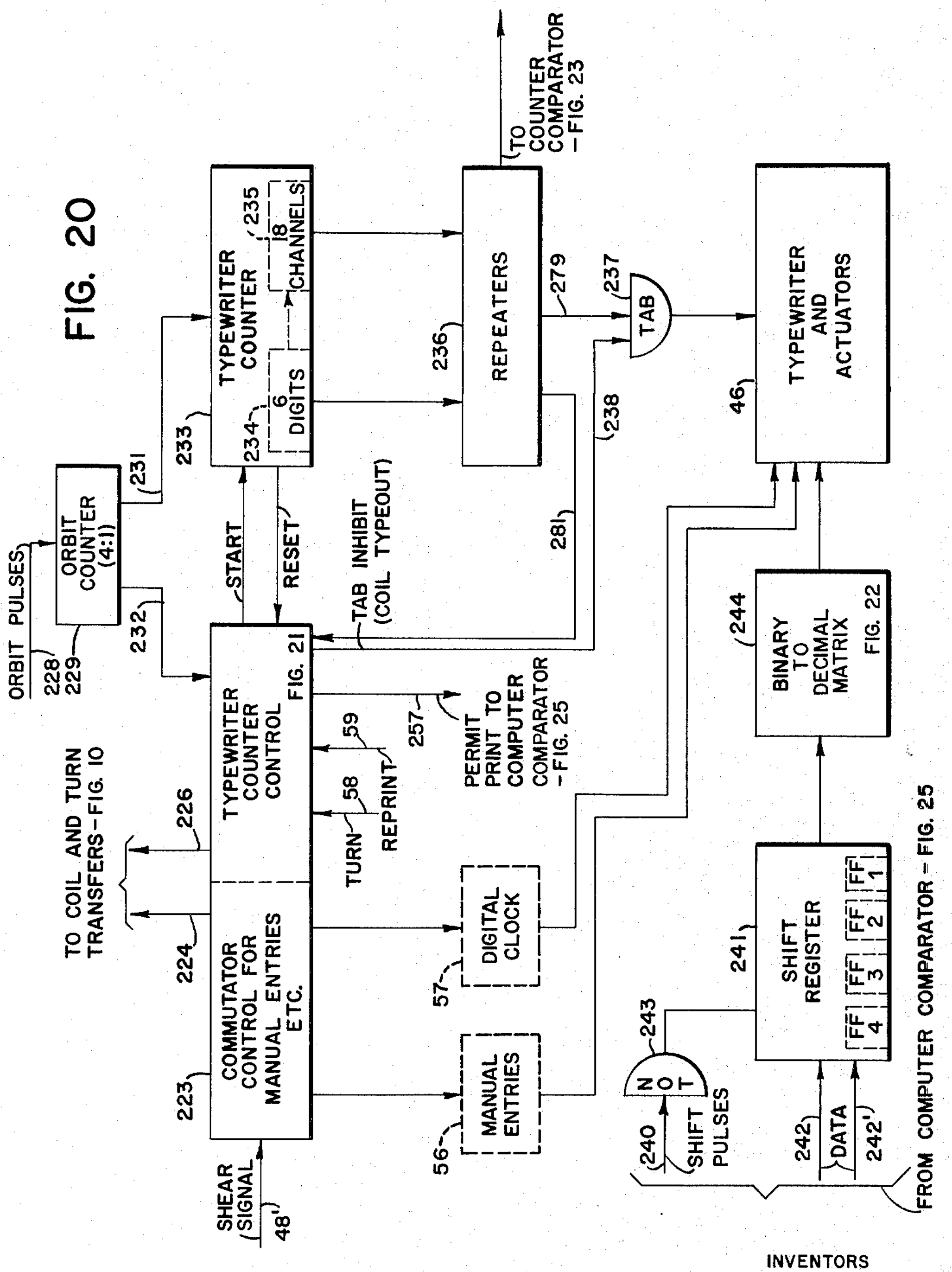
FIG. 20 shows an output section for typing out accumulated data.

The signals initiating the coil and turn transfer are obtained from the output section (FIG. 20). The transfer units are reset by orbit pulses through line 138.

In order to shorten the pulses applied to delay line125, short pulses recurring at 50 kc. are applied through line 139 to OR 127. thereby giving pulse lengths as shown at (*h*) in FIG. 12. Upon issuing from delay line 125 they are again lengthened by FF126.

The counter comparator shown in block 141 of FIG. 10 will be described later.

Figure 11:
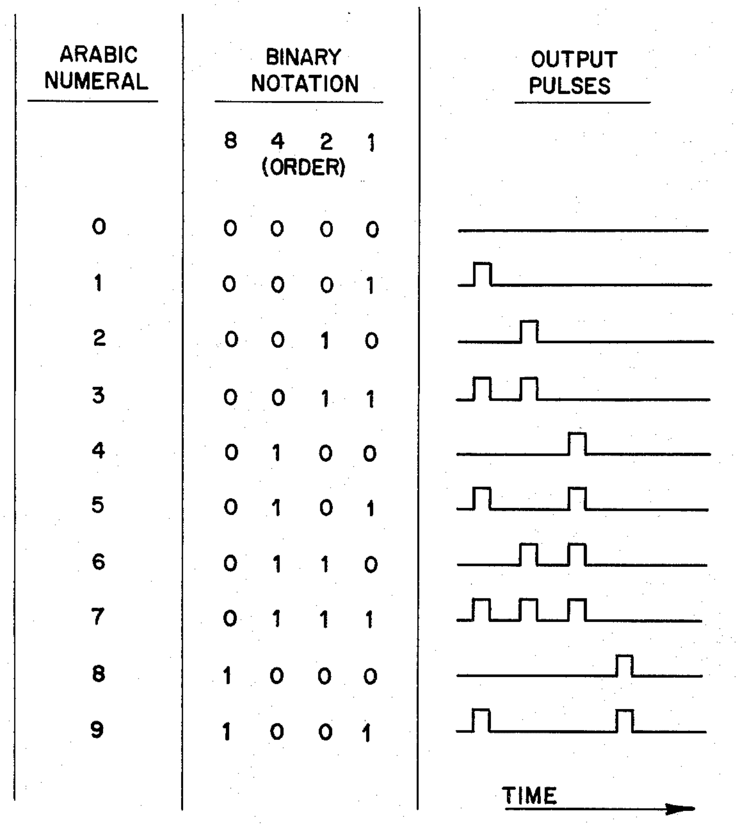

Considering now further details in the operation of the accumulator, FIG. 11 shows the binary code used in the present embodiment. The first column shows Arabic numerals 0 through 9. The corresponding binary notation is shown in the second column. Four binary bits are required for one decimal place, and the weighting or "order" of the bits is indicated. Each bit may be 0 or 1, and the combination of the four bits for each Arabic numeral is shown. In this embodiment the pulses issue from the registers in succession, and the third column shows the output pulse sequence corresponding to each Arabic numeral.

FIG. 11 shows the various combinations for one decimal place. For six decimal places, as here contemplated, there will be six sets of the pulses shown in FIG. 11, occurring successively.

FIG. 13A is a diagram of an FF unit which is used in many parts of the system. It comprises two PNP transistors Q1 and Q2 with grounded emitters and cross-connected bases and collectors. The collector loads are resistors leading to a power source denoted —V. The bases are connected through high resistances to another power source denoted +V. Triggering input circuits are connected to the bases of both transistors. Input D is for D.-C. level control and inputs H and F are D.-C. inputs through diodes which prevent current flow in the reverse direction. J and E are A.-C. triggering inputs. The inputs for Q2 are similar.

Assuming Q1 to be conducting, its collector will be at very nearly ground potential and the potential of K will be substantially ground. By the cross connection, Q2 will be cut off and the potential at L will be substantially —V. Q1 is changed from conducting to non-conducting states by making its base positive to ground. This may be accomplished by applying pulses to J or E, triggering being produced by the positive-going edges of the pulses. Inputs H and F allow levels to be established which must be overcome by pulse inputs at J and E, respectively. Inputs D and S are D.-C. inputs for negative signals. When Q1 is rendered non-conducting, the potential of K goes to substantially —V and, by the cross-connection, Q2 becomes conducting and the potential at L goes in the positive direction to substantially ground.

By applying positive levels to N or P, Q2 can be changed from conducting to non-conducting stages, and similarly for the positive-going edges of pulses applied to M or R.

This type of bistable multi-vibrator or flip-flop is well-known in the art, and commercial units are available. By suitably interconnecting inputs and outputs, or using various combinations of input connections, many types of logic functions can be performed. Most of the applications of FF units in the present system do not utilize all the inputs and outputs shown in FIG. 13A. However, such units are usually employed for convenience in installation and replacement.

Figure 13B:
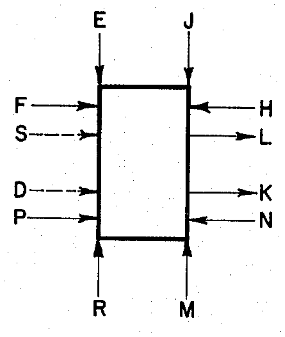

FIG. 13B is a diagrammatic representation of FIG. 13A with the inputs and outputs denoted by the same letters. Where it is believed desirable for clarity, FF units in the drawings are often represented as shown in FIG. 13B.

It will be understood that this circuit is given by way of example only, and that many alternatives are known in the art.

Figure 14:
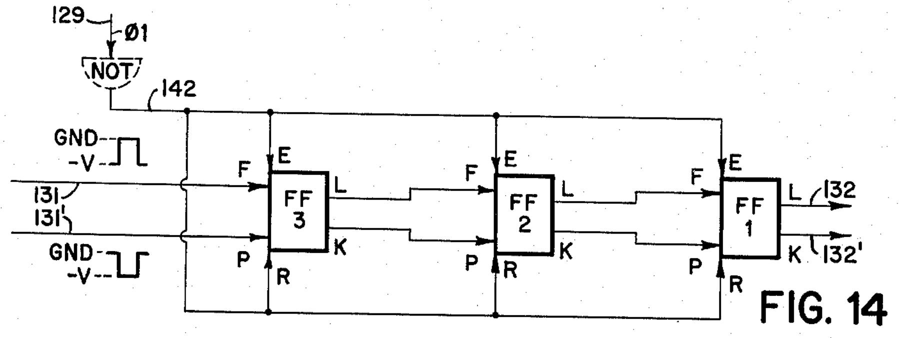
FIGS. 14 and 15 illustrate a shift register and an example of operation thereof.

FIG. 14 shows a shift register for unit 124 of FIG. 10. Three FF units are interconnected as shown, and input pulses in lines 131, 131' are applied to the F and P terminals. The input at F is a positive-going pulse and that at P is a negative-going pulse for a "1," as shown by the waveforms adjacent the inputs. Shift pulses as shown at (*b*) of FIG. 12 are applied through line 142 to the E and R inputs of each FF. These are obtained by passing the $\phi 1$ gate of FIG. 12 through a NOT circuit which inverts the gate to form the shift wave.

The relative magnitudes of the signal pulses in lines 131, 131', and the shift pulses in line 142 are selected so that the condition of FF3 can only be changed when a plus level on F or P coincides with a positive-going edge of a shift pulse on E or R. The same relationship obtains for input pulses at F and P and shift pulses at E and R for succeeding FF units.

In FIG. 14 it is assumed that a negative level of an L output terminal represents "0," and a positive level (actually ground) represents "1." Assuming all three FF units initially in the "0" condition, the negative outputs at L correspond to the non-conducting condition of Q2 and conducting condition of Q1 therein. If, now, a positive signal pulse appears in line 131, when the shift pulse goes positive at the end of $\phi 1$, Q1 in FF3 will be cut off, thus giving a positive output (actually ground) at L. The negative-going signal pulse at P prevents triggering of Q2. Thus, FF3 is now in the "1" condition. The conditions of FF2 and FF1 are unchanged, since the positive-going trailing edge of the shift pulse has passed before a positive signal from L of FF3 is supplied to F of FF2.

If another positive signal pulse arrives during the next $\phi 1$ interval, FF3 will remain in the same condition, still giving a "1" output. However, FF2 will now change to its "1" state, due to the positive input from L of FF3 when the shift pulse is effective. FF1 remains unchanged, since the shift pulse has passed before L of FF2 goes positive.

If there is no signal pulse in lines 131, 131' during the next shift interval, representing a "0," F of FF3 will be negative and P will be positive. Accordingly, Q2 in FF3 will be cut off at the end of the shift pulse, giving a negative output at L. FF2 will remain in its "1" state since that was the previous state of FF3. FF1 will now assume its "1" state corresponding to the previous state of FF2.

The overall operation will be illustrated by reference to FIG. 15, assuming that coded pulses corresponding to the numeral 3 are applied to the shift register. From FIG. 11 it will be seen that numeral 3 corresponds to two "1" pulses for the first two bits and no pulses or "0" for the next two bits.

Figure 15:
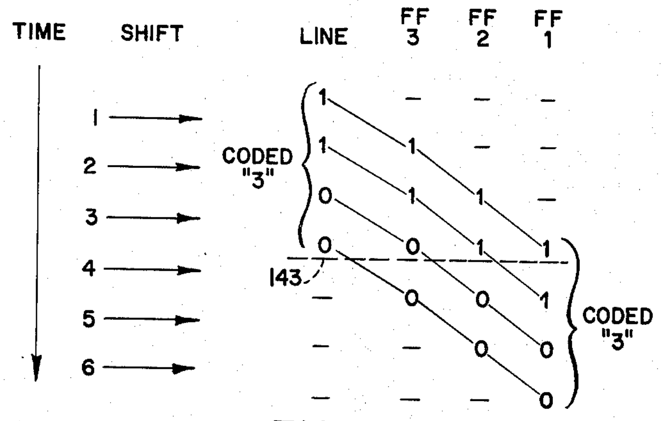

In FIG. 15 the three FF units are assumed to be initially in their "0" status. When a "1" bit pulse is applied to the input of FF3, denoted "LINE," and the first shift pulse occurs as shown by the horizontal arrow 1, FF3 assumes its "1" status and the other two remain unchanged. Shortly thereafter, another "1" bit is applied to FF3, as shown in the second line. Upon the occurrence of shift pulse 2, FF3 continues in its "1" state and FF2 goes to the "1" state corresponding to the previous condition of FF3. During the third bit interval there is a "0" input to FF3. Consequently, upon the occurrence of shift pulse 3, FF3 will change to its "0" state, FF2 will assume a "1" status, and FF1 a "1" status. If no further "1" input signals arrive, the operation will continue until all FF's have reverted to their "0" status.

After four bit-intervals have occurred, the status of the input line (131) and that of the three FF units will be as indicated by the dash line 143. At this time FF1 is in the "1" state and an output pulse will be delivered to "L" thereof, forming the first pulse of the numeral 3. Successive shifts will result in an output pulse sequence shown by the brackets and labeled "Coded '3'." This corresponds to the pulse sequence shown for numeral 3 in FIG. 11.

The operation of shift registers is known per se in the art so that further explanation is unnecessary.

It will be noted that a number of shift pulse intervals are required for a coded pulse to pass through the shift register, and this time must be taken into account in establishing the delay in delay line 125 of FIG. 10, so that the overall time for circulating pulses is the selected orbit length.

Considering now the remainder of FIG. 12, the overall operation for circulating and transferring coded pulses will be explained. The portion of the figure through (*i*) has already been explained, and these are the pulses applied to the registers 122–124 through line 131. Pulses of the opposite polarity are supplied through line 131'.

Considering first the FF3 units in each register, the dotted coil pulses 144 in phase 2 will be entered into the coil FF3 unit upon the occurrence of the positive-going trailing edge of the $\phi 2$ shift pulse, which is at the end of the $\phi 2$ interval. This causes FF3 to assume its "1" condition, as indicated at 145. During the next $\phi 2$ interval, another pulse 146 arrives so that there is no change in the coil FF3 unit.

During the next $\phi 2$ interval the input is a "0," so the coil FF3 goes to its "0" condition as shown at 147. During the succeeding $\phi 2$ interval another pulse 148 appears and the coil FF3 goes to its "1" condition, as shown at 149.

Considering the turn FF3 unit, turn signal pulses 151 occur in successive $\phi 3$ intervals, causing the turn FF3 unit to assume its "1" condition, as shown at 152. Buffer pulses 153 are shown as occuring at every other $\phi 1$ interval, so that the buffer FF3 unit assumes corresponding "1" states, as shown at 154, 155 and 156, with intervening "0" states.

The FF2 units in each register assume the same states as the corresponding FF3 units but delayed by the interval between respective shift pulses (60 microseconds). Thus (*j*) may be compared with (*m*), (*k*) with (*n*), and (*l*) with (*o*), corresponding states being given the same numerals with a prime.

Similarly, the FF1 units assume the status of the FF2 units, but again delayed by the interval between respective shift pulses, as shown by corresponding numerals with a double prime in (*p*), (*q*) and (*r*).

As explained in connection with FIG. 10, the outputs of each of the three shift registers recirculate through line 128 in their respective phases. Without the 50 kc. gating from line 139, the pulses in line 128 would be as shown at (*s*). These are given the same numerals as before with an added "U". However, due to the 50 kc. gating, the actual pulses in line 128 are shorter, as shown at (*t*). This avoids pulses running together such as would occur for 154U, 145U and 152U.

When accumulated coil data are transferred to the buffer, pulses formerly occurring in coil $\phi 2$ now occur in buffer $\phi 1$. By comparing (*u*) of FIG. 12 with (*s*), it will be seen that the dotted coil pulses in $\phi 2$ of (*s*) now appear as full-line buffer pulses in $\phi 1$ of (*u*). The turn pulses are unchanged, so that dashed pulses in (*s*) occur in the same $\phi 3$ intervals in (*u*). Corresponding gated output pulses are shown at (*v*). Inasmuch as previously stored buffer pulses are eliminated during the transfer, the full-line buffer pulses in (*t*) no longer appear.

The transfer of pulses from turn to buffer is illustrated at (*w*) and (*x*). This is similar to the coil transfer except that the turn pulses formerly in $\phi 3$ now occur in $\phi 1$.

It should be noted that each FF unit in the shift registers remains in a given condition for three phase intervals, or 60 microseconds, even though pulses recirculate through delay line 125 at 20 microsecond intervals. This makes it possible to transfer coil and turn pulses from their respective phases to phase 1 by relatively simple gating. Also, the required speed of operation of the FF units is considerably relaxed.

Figure 16:
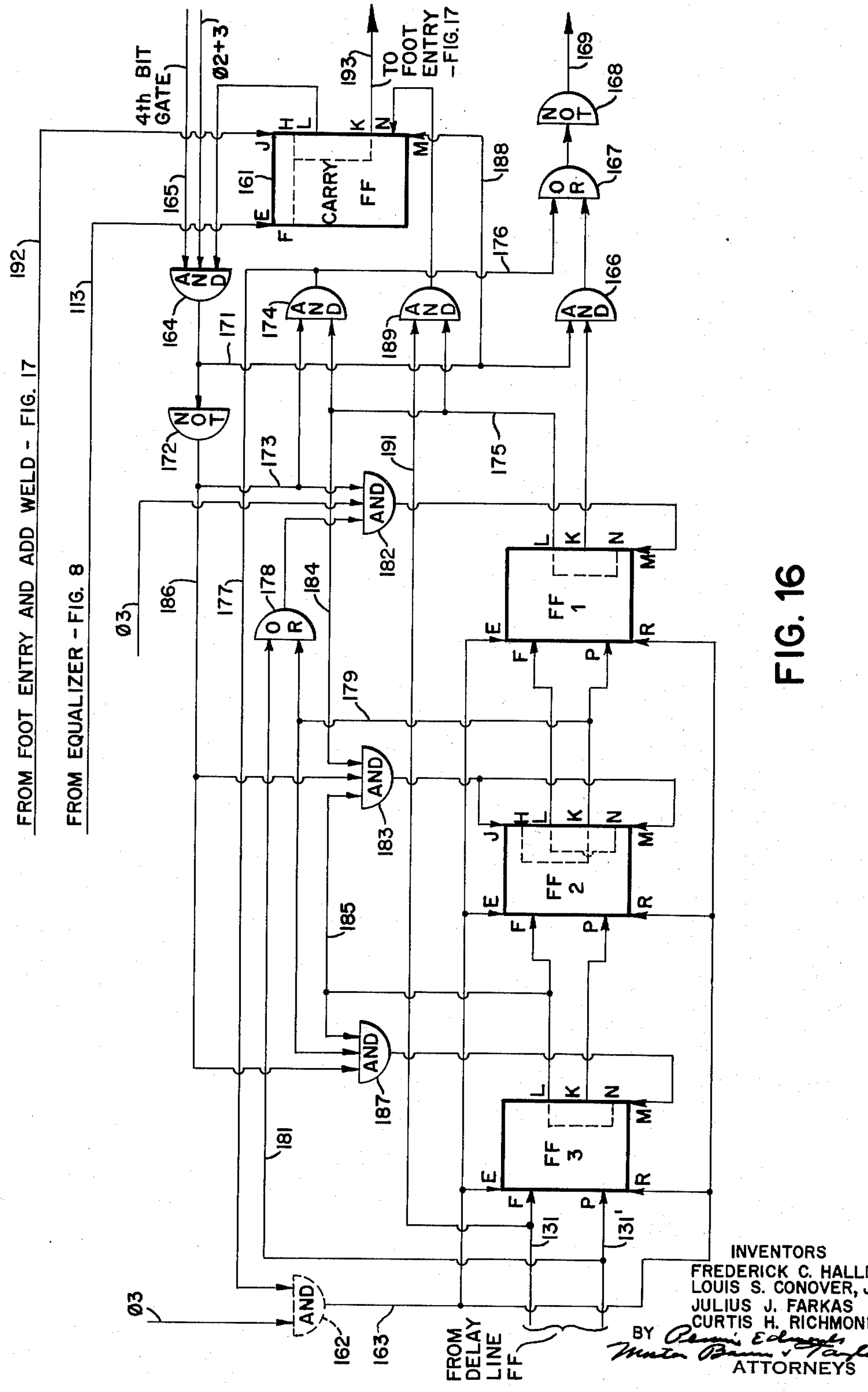
FIG. 16 illustrates a count-shift register.

Considering now the manner in which defect information is entered into the loop storage system, and the manner in which coil and turn totals are successively increased by one upon arrival of successive defects, FIG. 16 shows a count-shift register such as employed for registers 122 and 123 of FIG. 10. As shown, it is for the turn register 123.

It will be recalled that defect information from the equalizer of FIG. 8 is supplied through line 113 in the foot 1 intervals of respective channels. Hence, the defect pulses can arrive only at spacings of 1740 microseconds or multiples thereof. As shown in FIG. 16, these defect pulses are supplied to input E of the carry FF 161. Hence output L thereof goes plus upon arrival of a defect pulse. Carry FF161 serves to store the defect for a sufficient time to allow it to be entered and counted.

The count-shift register contains three FF units 1, 2 and 3 which are interconnected in the same manner as the shift register of FIG. 14. However, there are additional connections in order to enable counting to take place. Before further describing FIG. 16, the basis for its operation will be given.

During the operation of the shift register portion, as the four bits representing a given decimal digit pass therethrough, a condition is reached wherein the states of FF1, FF2 and FF3 correspond to the first three bits, and the state of the input lines to F and P of FF3 corresponds to the fourth bit. This is indicated at 143 in FIG. 15. At this time, then, the previously stored digit is known, and it is assumed initially that this corresponds to the first, or unit, decimal place. Accordingly, upon arrival of a new defect pulse, it is necessary to increase the stored digit by 1.

Referring back to FIG. 11, whenever 1 is added, the output of the first order flip-flop, FF1, must change from "0" to "1," or vice versa. This suffices when adding 1 to an even number (including 0) since the status of the other bits remains unchanged. For example, changing from 4 to 5 takes place as follows:

| Time interval | Input line | FF 3 | FF 2 | FF 1 | Output |
|---|---|---|---|---|---|
| (1) | 0 | 1 | 0 | $\bar{0}$ | 1 |
| (2) | | 0 | 1 | 0 | 0 1 |
| (3) | | | 0 | 1 | 1 0 1 |
| (4) | | | | 0 | 0 1 0 1 |

(I)

In this notation, under "Time Interval" are four successive shift pulse intervals. Under "Input Line" and "FF 3, 2, 1" are shown the "0" or "1" conditions of the line and FF3, FF2 and FF1. Under "Output" is given the corresponding pulses (1)or no pulses (0) which occur successively.

In the first time interval a coded "4" is present. To add 1, it is necessary to invert the output of FF1 as shown by the bar above the 0, so as to give a 1 in the output. This is accomplished by passing the output of FF1 through an inverting circuit. Conditions of the FF units for successive shifts are shown on successive lines, along with the output pulse sequence. After the 4th shift pulse interval, output pulses will have been delivered corresponding to the numeral 5, as is apparent.

When adding 1 to an odd number, a shift is skipped after the first bit is delivered to the output line. This suffices in changing from 1 to 2. Using the same type of presentation as above:

| | | | | | |
|---|---|---|---|---|---|
| (1)------- | 0 | 0 | 0 | $\bar{1}$ | 0 |
| (2)X----- | | 0 | 0 | 1 | 1 0 |
| (3)------- | | | 0 | 0 | 0 1 0 |
| (4)------- | | | | 0 | 0 0 1 0 |

(II)

A new symbol "*x*" is employed to indicate that that shift is skipped. Consequently, the FF units remain in their previous condition. However, the interval corresponding to the omission of the shift still occurs, so that a pulse is delivered to the output line during this interval. Thus, the first shift pulse causes a "1" to issue from FF1 which is inverted to form a "0" in the output. The skip shift interval causes the 1 to again issue from FF1, but this is not inverted. Successive shifts occur in normal manner. From the last line of the output it will be noted that the binary "2" has been delivered to the output line.

When adding 1 to other odd numbers, additional operations need to be performed. Thus, following the same presentation, and changing from 3 to 4:

| | | | | | |
|---|---|---|---|---|---|
| (1)------- | 0 | 0 | 1 | $\bar{1}$ | 0 |
| (2)X----- | | 0 | 1 | $\hat{0}$ | 0 0 |
| (3)------- | | | 0 | 1 | 1 0 0 |
| (4)------- | | | | 0 | 0 1 0 0 |

(III)

Another new notation in the form of a caret (∧) has been introduced. This indicates that the status of FF1 has been changed by the application of an appropriate pulse thereto. Thus, at the second (skip) shift interval the status of FF1 is changed so that it is now in the "0" condition instead of the previous "1" condition. It will be observed from the last output line that the numeral 4 is delivered to the line.

Following the same presentation, in changing from 5 to 6 the following operations are performed.

| | | | | | |
|---|---|---|---|---|---|
| (1)------- | 0 | 1 | 0 | $\bar{1}$ | 0 |
| (2)X----- | | $\hat{0}$ | $\hat{1}$ | 1 | 1 0 |
| (3)------- | | | 0 | 1 | 1 1 0 |
| (4)------- | | | | 0 | 0 1 1 0 |

(IV)

In changing from 7 to 8:

| | | | | | |
|---|---|---|---|---|---|
| (1)------- | 0 | 1 | 1 | $\bar{1}$ | 0 |
| (2)X----- | | 1 | $\hat{0}$ | $\hat{0}$ | 0 0 |
| (3)------- | | | 1 | 0 | 0 0 0 |
| (4)------- | | | | 1 | 1 0 0 0 |

(V)

In changing from 9 to 0:

| | | | | | |
|---|---|---|---|---|---|
| (1)------- | 1 | 0 | 0 | $\bar{1}$ | 0 |
| (2)X----- | | 0 | 0 | $\hat{0}$ | 0 0 |
| (3)------- | | | 0 | 0 | 0 0 0 |
| (4)------- | | | | 0 | 0 0 0 0 |

(VI)

Describing now the circuits for performing these operations by reference back to FIG. 16, input signals from the delay line are introduced to FF3 through lines 131, 131' as before. Phase 3 shift pulses are also introduced by supplying $\phi 3$ gate pulses to AND 162 which inverts the gate pulses and supplies them to the FF units through line 163. Internal connections in the FF units are shown by dotted lines. Thus, in all FF units L is connected to N. In addition, in FF2, H is connected to K.

Since the counting operation is to take place only when the first bit of a decimal digit is in FF1, AND 164 is employed for control. A 4th bit gate is supplied through line 165 from the gate generator 121 (FIG. 10). This gate is shown at (*g*) of FIG. 12. The gate duration is equal to three bit intervals corresponding to the three phases, and recurs at every fourth set. Thus AND 164 can open only during the time corresponding to a fourth bit, and at this time the first bit is in FF1. AND 164 is also supplied with the $\phi 2+3$ gate shown at (*b*) of FIG. 12. A $\phi 3$ gate could be employed at this point, but the $\phi 2+3$ allows more time for actuating certain logic units while preserving proper operation.

When a defect arrives at the beginning of a given data channel, carry FF161 supplies a + output from L thereof to AND 164, and the latter opens during the next fourth bit, at which time the units decimal digit for that type of defect is in the shift register.

In the absence of a defect, the output of FF1 is from terminal K thereof, and is inverted successively by AND 166, OR 167 and NOT 168, to give an output of opposite polarity in line 169 which goes to AND C and D of FIG. 10. Thus for a "1" output of FF1, with L positive and K negative, a "1" is fed to line 169. However, a defect pulse issuing from AND 164 is negative, thereby closing AND 166 through line 171. At the same time, the defect pulse is inverted by NOT 172 and fed through line 173 to activate AND 174. The latter is fed from output L of FF1 through line 175. The output of AND 174 is connected by line 176 to OR 167. Since L and K of FF1 are of opposite polarity, the signal to output line 169 is opposite in polarity to that which would be fed thereto through AND 166.

Thus whenever a defect is added, the effective output of FF1 to line 169 is inverted, as discussed above for Table I.

To skip a shift after the first bit when the number is odd, as illustrated in Table II, the output of AND 174 is utilized. For an odd number, L of FF1 is positive, the output of AND 174 is negative, and this is fed through line 177 to inhibit AND 162, thereby preventing a shift pulse from passing therethrough.

In changing from 3 to 4, 7 to 8, and 9 to 0, shown in Tables III, V, and VI, FF1 must be triggered from "1" to "0" at the time of the skip shift. The conditions indicating that a 3 or 7 or 9 is in the shift register is recognized by OR 178, which has inputs connected to K of FF2 through line 179 and to input line 131′ through line 181. Line 179 is negative for 2, 3, 6 and 7 since for these numbers FF2 is in its "1" state (see FIG. 11). Line 181 is negative for 8 and 9, since the input to the shift register is a "1." The presence of 2, 6 and 8 in these groups can be tolerated, since for these numbers FF1 is already in its "0" state. Hence, whenever a 3, 7, or 9 is in the register, the output of OR 178 is positive and activates AND 182.

AND 182 is supplied with the $\phi 3$ gate and with the defect output pulse of NOT 172. The latter is positive for a defect pulse. The corresponding negative output of AND 182 is fed to M of FF1. The internal connection of N to L of FF1 makes N positive (ground) for an odd number. Accordingly, from FIG. 13A, the capacitor of input M is charged and, upon termination of the defect pulse at the end of $\phi 3$, the output line of AND 182 goes positive and triggers FF1 to its "0" state.

The $\phi 3$ gate is applied to AND 182 to prevent false actuation by an input pulse in line 131′ in the coil or buffer phase.

In changing from 5 to 6 and 7 to 8, the state of FF2 must be inverted from "0" to "1" and from "1" to "0," respectively, during the skip shift interval, as shown in Tables IV and V. From FIG. 11, 5 and 7 are recognized by a "1" in FF1 and a "1" in FF3. AND 183 has input lines 184 and 185 connected to L of FF1 and FF3, respectively, which are positive under these conditions. It is also connected to the output of NOT 172 through line 186. Accordingly the output of AND 183 goes negative when a defect pulse is present. If FF2 is in its "1" condition, FF2 is triggered to "0" through its M input in the manner just described for FF1. If it is in its "0" condition, a similar operation takes place through the internal connection of the H and K terminals, and it is triggered to "1" through input J.

Finally, in changing from 5 to 6, FF3 must be changed from "1" to "0" during the skip shift interval. The number 5 is uniquely recognized by a "1" in FF1, a "0" in FF2 and a "1" in FF3. However, the last two states are common only to the numerals 4 and 5, and a triggering pulse can be tolerated for 4 since, in changing from 4 to 5, FF3 changes from "1" to "0" at the second shift as shown in Table I.

Accordingly, AND 187 has inputs from L of FF3 and K of FF2, as well as a defect pulse input from NOT 172. The output of AND 187 is connected to M of FF3, and triggering occurs upon termination of the defect pulse, in the manner above described.

In counting up to 9, carry FF161 is reset at the end of the 4th bit gate (or the $\phi 2+3$ gate) by connecting the output of AND 164 through lines 171 and 188 to its M input. However, when adding 1 to 9, it is necessary to carry over a 1 to the next digit (tens). The number 9 is recognized by a "1" in FF1 and a "1" in input line 131. These states are fed to AND 189 through lines 175 and 191, and the resultant negative output supplied to terminal N of carry FF161. This prevents the resetting of FF161, and AND 164 will remain activated, ready to open during the next 4th bit gate, to add 1 to the next digit. If further carryovers are required, as in adding 1 to 999, etc., carry FF161 continues in its "set" condition until no further carryover is required.

It may be mentioned that the presence of a "1" in the first bit of the second decimal place will not interfere with the change from 9 to 0 in the first decimal place, since the 4th bit gate will have closed by that time and only shift register operation will be taking place.

Figure 17:
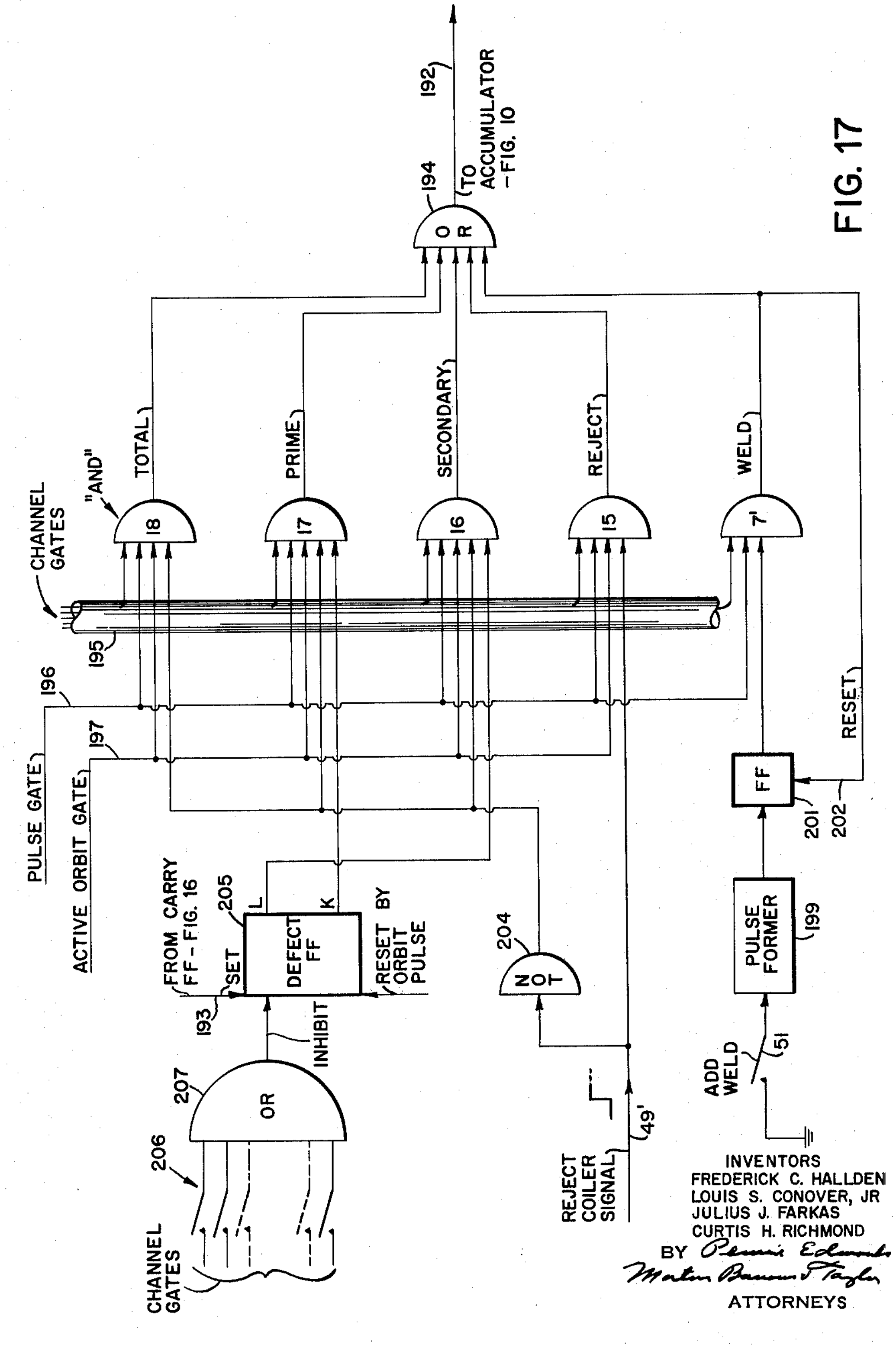
FIGS. 17 and 18 illustrate a foot entry and add-weld unit and waveforms applicable thereto.

In addition to totaling defects from the equalizer, additional signals to be totalled may arrive from the Foot Entry and Add weld unit of FIG. 17 through line 192. These are supplied to the J input of the carry FF161, which is an input like E (see FIG. 13A).

Output K goes negative when FF161 is set by a defect, and positive upon reset. It is a convenient source for a delayed defect signal to the Foot Entry unit of FIG. 17 and is fed thereto through line 193.

The coil count shift register is similar to that of FIG. 16, but $\phi 2$ gates are fed thereto instead of $\phi 3$, and $\phi 1+2$ instead of $\phi 2+3$. Also, K of carry FF161 supplies an output to the Profile System through line 193′ (FIG. 10).

*Foot entry and add weld*

Referring now to FIG. 17, the foot entry and add weld unit 69 (FIG. 3) is shown. The overall purpose of this unit is to supply pulses to the accumulator for totalizing the number of feet of strip in a coil or turn, the prime, secondary and reject footage, and to add manual weld signals to the automatically sensed weld signals. These are to be totalized in corresponding data channels assigned thereto.

AND gates 7′ and 15–18 are provided, these corresponding to the number of the respective data channel. The prime for the channel 7 gate is to distinguish it from the channel 7 gate in FIG. 7.

The outputs of the AND gates are fed to OR 194 and thence through line 192 to the coil and turn carry FF units (FIGS. 10 and 16). Channel gates are supplied through line 195 to the AND gates so that they can open only during the occurrence of the respective data channels. Pulse gates are also supplied to the AND circuits through line 196. These pulses occur near the beginning of each channel and prior to the occurrence of the first 4th bit gate for that channel, as indicated at (*k*) in FIG. 18. The exact duration is comparatively unimportant so long as the pulses terminate during respective channels, but in practice they are made about 20 microseconds long. Thus any signal to be added to previous totals is supplied to the coil and turn shift registers 122, 123 (FIG. 10) prior to the count cycles thereof.

Active orbit gates are also supplied to all AND circuits except 7′ through line 197 so that gates 15–18 can open only during an active orbit corresponding to one foot of travel of the strip.

Considering first the adding of a weld, upon the closing of switch 51 by the operator an input is supplied to pulse former 199 which develops a pulse of constant length. For each actuation of the switch the pulse is fed to FF201 whose output then goes positive to enable AND 7′. Thus, at the beginning of channel 7 a pulse is delivered from the output of 7′ to OR 194 and thence to the accumulator. The output pulse of 7′ is fed back through line 202 to reset FF201, ready for the next add weld.

When the reject shear 36 of FIG. 1 is actuated, and reject coil 37 begins to rotate, reject coiler switch 49 supplies a signal through line 49′ to the reject AND 15 of FIG. 17. Thus, output pulses from AND 15 are supplied through OR 194 to the accumulator, one for each linear foot of the strip wound on the reject coil. The signal level in line 49′ is inverted by NOT 204 and fed to the inputs of AND 16–18 to maintain them closed.

In the absence of a reject coiler signal, AND 18 opens once for each linear foot of travel of the strip, at the beginning of data channel 18, and supplies pulses to the accumulator.

AND 16 and 17 have additional inputs controlled by the defect FF205. In the absence of a defect, FF205 is in its reset condition and a positive output from K is supplied to AND 17 so that AND 17 yields an output pulse for each linear foot of travel of the strip. Output terminal L of FF205 has the opposite polarity, and keeps AND 16 closed when there are no defects.

The setting of FF205 by a defect is accomplished by a signal from carry FF161 (FIG. 16) through line 193. As already described, this defect signal is produced by the resetting of carry FF161 after the defect has been entered in the total for that data channel. Resetting of carry FF161 and consequent setting of defect FF205 will take place prior to the end of the data channel in which the defect occurs, and these channels are ahead of channels 16 and 17. Consequently, if a defect is registered in any of data channels 1 through 14, defect FF205 will be set at the time data channels 16 and 17 occur.

The setting of defect FF205 reverses the polarities at L and K, closing prime AND 17 and opening secondary AND 16, so that a secondary footage signal is delivered to the accumulator.

Defect FF205 is reset by the next orbit pulse, ready to receive additional defect signals.

In this embodiment it is desirable to have the secondary data channel 16 precede the prime channel 17 to prevent adverse feedback effects, from the carry FF161 to defect FF205. With the opposite order, an output from prime AND 17 would set carry FF161, and the resetting of FF161 would set defect FF205, thereby counting a secondary foot even though no defect were present. The order shown in FIG. 17 avoids this difficulty.

Certain types of defects, while desirable to know, will not change the strip category from prime to secondary. Since the types of defects may vary depending on the use of the strip, provision is made so that the selection can be made by the operator. This is termed the "Definition of Prime."

At the left of FIG. 17 channel gates are fed to corresponding switches 206 and then through OR207 to defect FF205. With all switches open, the defect FF functions as already described. However, closure of any one of switches 206 will inhibit defect FF205, so that it cannot respond to a defect occurrnig in that data channel.

It may be pointed out that once defect FF205 has been actuated by a defect in any data channel during an orbit, defects in other data channels during that orbit have no effect. Thus, only one secondary foot is counted for a given foot of travel of the strip, regardless of how many defects may be present in that particular foot.

Figure 18:
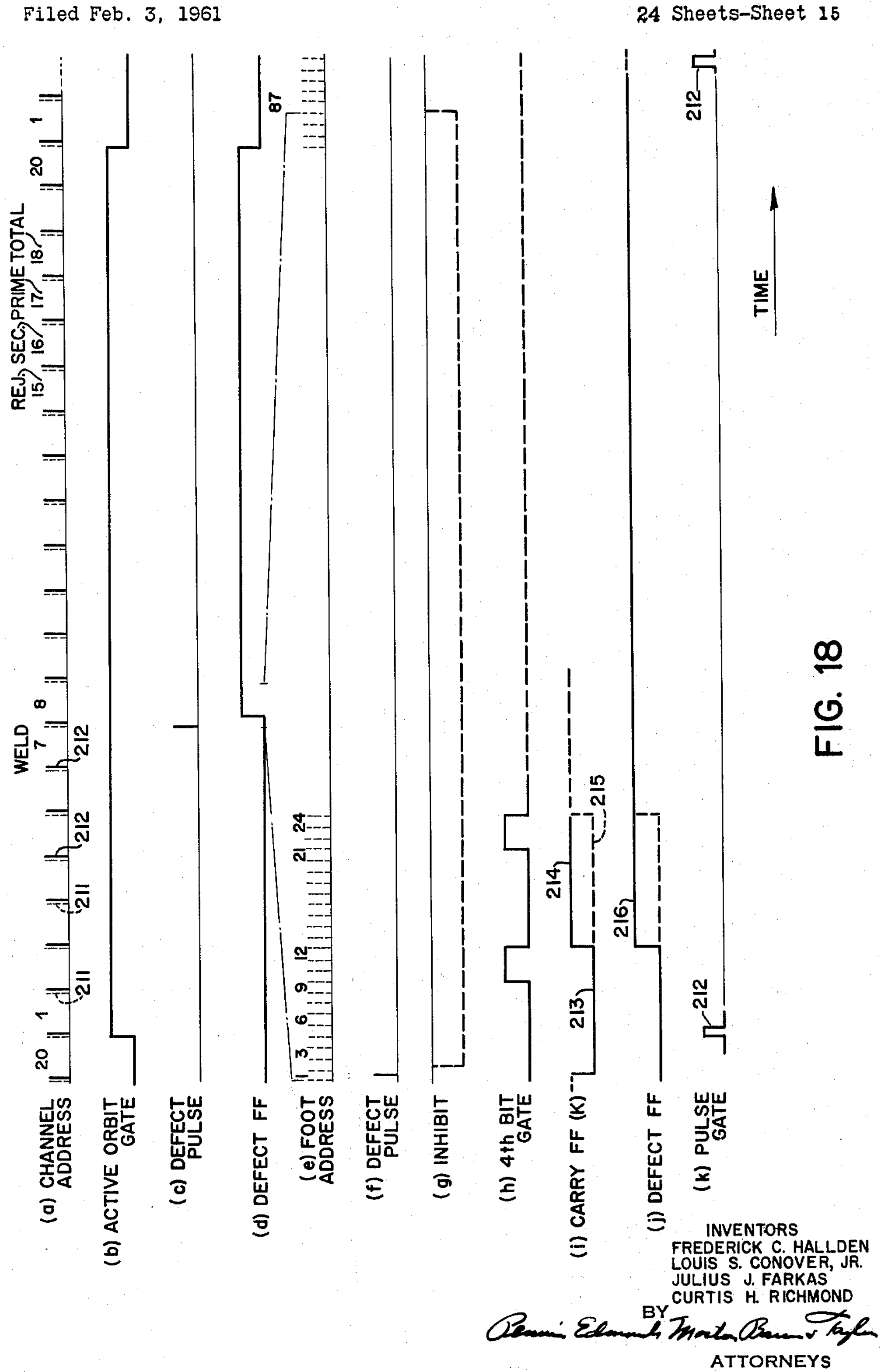

FIG. 18 shows waveforms illustrating the operation of FIG. 17. At line (*a*) the twenty data channels are shown by dash lines 211 and selected channels are numbered. The full line pulses 212 represent the pulse gates in line 196 which occur shortly after the beginning of each channel. At (*b*) is shown an active orbit gate supplied to line 197. At (*c*) a defect pulse is shown occurring in channel 8 (pinhole). The corresponding actuation of defect FF205 is shown at (*d*), it being observed that it remains actuated until the end of the active orbit gate.

At (*e*) channel 8 is expanded to show the foot address intervals. At (*f*) the pinhole defect pulse is shown, occurring in the foot 1 interval. If pinhole defects were considered not to affect the prime character of the strip, an inhibiting signal would be developed at the output of OR207 for channel 8, as indicated at (*g*). For the remainder of the figure, it is assumed that there is no inhibition.

The 4th bit gate is shown at (*h*). This initially occurs during foot pulse intervals 10–12 and recurs at every 4th bit interval thereafter. When the defect pulse occurs, the carry FF161 (FIG. 16) is actuated, giving a negative output as indicated at 213. At the termination of the 4th bit gate, the carry FF is normally reset, whereupon terminal K goes positive as shown at 214. If a carry-over to the next digit is required, terminal K remains negative, as indicated at 215, but eventually goes positive when no further carry-over is required.

When terminal K goes positive, defect FF205 is actuated, as shown at 216. Once actuated, it remains in that condition until the end of the orbit. The pulse gates 212 of (*a*) are shown on an expanded scale at (*k*). It will be observed that they occur somewhat after the occurrence of a defect pulse, but prior to the initial 4th bit gate of (*h*).

Upon the simultaneous occurrence of a channel 16 gate, the corresponding pulse gate 212 and the active orbit gate, the positive potential of L of the defect FF205, shown at 216, will cause secondary AND 16 to open and feed a secondary footage pulse to the accumulator.

*Output section*

The description of the operation of the accumulator and the associated units for inserting data therein has now been completed. Accordingly, the output section for typing out the data will be described next.

Figure 19:
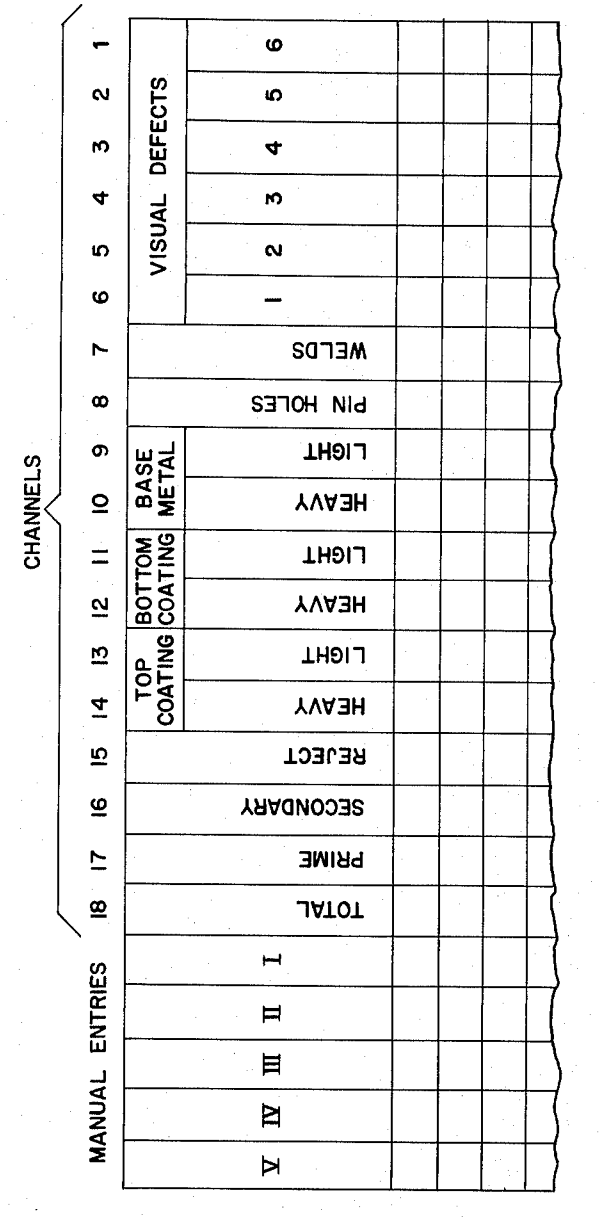
FIG. 19 is an illustrative form on which data is typed.

The output section contains a typewriter for typing out totals on a form such as shown in FIG. 19. FIG. 19 shows five columns, denoted I–V, for typing out manual entries, arranged in reverse order. It then shows eighteen columns corresponding to channels 1–18 in reverse order. The first six channels are used for visual defects, as has been explained in connection with FIG. 7. Channels 7–14 are for automatically-sensed defects, as also shown in FIG. 7. Channels 15–18 are for the indicated total footages, as shown in FIG. 17. Two of the twenty channels available were not used in the present embodiment and constiute spares.

FIG. 20 shows the overall arrangement of the output section, the typewriter and actuators therefor being indicated at 46. It is desired to automatically type out coil information as each coil is finished. Accordingly, a shear signal from prime shear switch 48 (FIG. 1) is supplied through line 48' to a control section 223. This section is shown in more detail in FIG. 21 but its overall functioning will be described briefly.

It is first desired to type out manual entries, such as date, time, lot number, etc. This is accomplished by means of a manual entries unit 56 and a digital clock 57, which feed the desired entries to typewriter 46 under the control of circuits in unit 223. Thereafter the channel totals are typed out under the control of other circuits in unit 223.

The shear signal will occur at random with respect to an orbit, and accordingly provision is made to send a coil transfer signal through line 224 to the coil transfer FF133 of FIG. 10, in proper phase with respect to the orbit. At the end of an 8-hour shift, when it is desired to type out turn totals, a suitable signal is manually applied at line 58 to send a signal through line 226 to the turn transfer FF134 (FIG. 10) so that turn information is then transferred to the buffer. If it is desired to repeat a type-out of data already in the buffer, a signal is applied to line 59.

The typewriter is fairly slow-acting, being capable of only, say, ten strokes per second. While an independent oscillator could be used to establish a suitable speed, in this embodiment orbit pulses are applied through line 228 to a 4:1 counter 229 to yield output pulses in lines 231 and 232 recurring at approximately 7 per second.

The typewriter actuation must be properly synchronized with the data stored in the buffer phase of the accumulator so that the digits are typed out in proper order. Accordingly, a typewriter counter 233 is provided. This contains a counter of 6 for digits, indicated at 234, feeding a counter of 18 for channels, indicated at 235.

Since in normal typewriter action the higher order digits are typed first, the digit counter 234 is arranged as a backward counter. Similarly, the channel counter 235 is arranged as a backward counter, corresponding to the order of presentation of FIG. 19. Gate waves corresponding to the digit intervals and channel intervals are supplied through repeater 236 to the counter comparator of FIG. 23. This is to pick out of the circulating pulses in the buffer those corresponding to the digit and channel which the typewriter is then ready to type out.

The output of repeaters 236 is also supplied to tab 237, which is a gate used to actuate a tab solenoid in the typewriter. Its function is to tab the carriage to the proper position for starting the type-out at column 18 of FIG. 19. During the initial type-out of coil information, the carriage returns fully to its left margin, which is Col. V in FIG. 19. Accordingly, for an initial coil type-out an inhibiting signal is supplied through line 238 so that tab 237 is ineffective. However, for a turn type-out or a reprint of either coil or turn data, the manual entries are not typed out. Accordingly, a signal from repeaters 236 to tab 237 passes therethrough and tabs the typewriter carriage to column 18.

Typewriter 46 may be of conventional type, and has solenoid actuators for striking the proper digits under the control of input signals thereto. Inasmuch as the pulses stored in the buffer zone are in a binary code, in this embodiment the binary coded digits are converted to decimal digits and then supplied to the typewriter actuators.

To this end a shift register 241 is employed containing four FF units arranged similarly to that described in FIG. 14. Here it is desired to have all four bits of a given digit available simultaneously, so an additional FF4 is employed for the 4th bit. Shift register 241 is supplied with data from the buffer through lines 242 and 242′. These lines contain buffer information like that in output lines 132, 132′ of the accumulator section of FIG. 10, but after voting has taken place between the three accumulators of the three computers of FIG. 2. Shift pulses are applied through NOT 243 to control the shifting of pulses through register 241.

The output of register 241 is supplied to a binary-to-decimal matrix 244 to obtain signals suitable for controlling the actuators of typewriter 46.

Figure 21:
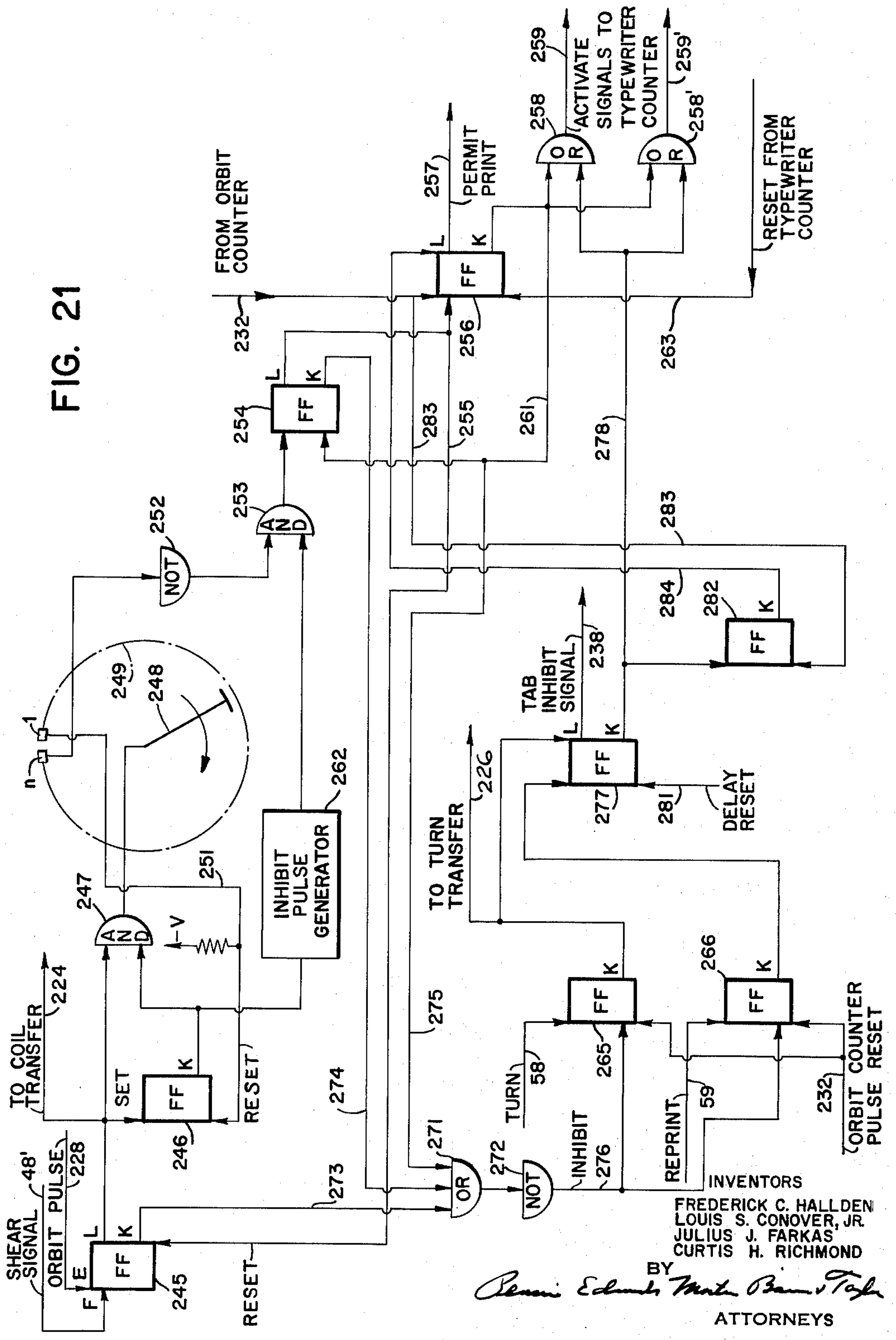
FIG. 21 shows the commutator and typewriter-counter control section of FIG. 20.

Referring now to FIG. 21, the control unit 223 of FIG. 20 is shown in more detail. The shear switch signal in line 48′ is supplied to input F of FF245. Normally the line is negative and inhibits FF245. When the prime shear switch closes, line 48′ goes positive (ground potential) and permits FF245 to be set by the next orbit pulse from line 228 to the E input. When set, output L of FF245 delivers a signal through line 224 to the coil transfer FF133 in FIG. 10, thereby initiating transfer of coil data to the buffer. FF133 is reset by the next orbit pulse as already described, thus providing one complete orbit for data transfer.

When FF245 is set, it sets FF246 and also delivers an enabling sginal to AND 247.

A commutator is shown having a rotating arm 248 and segments 1 through *n* arranged in a circle 249. The commutator segments are connected to the manual entries and digital clock units 56, 57 of FIG. 20. These units may contain manualy settable switches which in turn are connected to the typewriter actuators so as to type the desired numeral or letter as each commutator segment is passed.

The commutator arm 248 is continuously rotating and its position will be random with respect to a shear signal. Accordingly, the energization of the arm is controlled through FF246 and AND 247. The setting of FF246 applies a negative signal to AND 247 to keep it closed. Hence the commutator arm 248 is normally positive. When it reaches segment 1, the positive signal is supplied through line 251 to reset FF246. This opens AND 247, arm 248 goes negative, and the manual entries and digital clock information are typed out as the commutator rotates.

When arm 248 reaches the last segment *n*, its negative potential is inverted by NOT 252 and opens AND 253, which in turn sets FF254. The resultant signal at L of FF254 is supplied through line 255 to reset FF245. This closes AND 247 and the commutator is de-activated.

At this time the manual entries, etc. have been typed out and the type-out of data can begin. Output L of FF254 is supplied to a D.C. preconditioning input to FF256 so that the next pulse through line 232 from the orbit counter 229 (FIG. 20) will trigger FF256 to its set condition. This delivers a "permit print" signal through line 257 to the computer comparator of FIG. 25 to start the voting operation thereof, as will be described.

Output K of FF256 is supplied to OR 258 and OR 258′ which deliver corresponding signals through lines 259 and 259′ to the typewriter counter 233 (FIG. 20). The counters in 233 are arranged to be normally held in their 6th digit and 18th channel positions. The activate signals in lines 259, 259′ remove the inhibition and allow the counters to start. The output K of FF256 is supplied through line 261 to reset FF254.

When the commutator arm 248 initially contacts segment 1, it will also be in contact with segment *n*. Consequently, there is danger that the resetting of FF246 by the arm contacting segment 1 will immediately be counteracted by a reset of FF245 by the action just described for FF254 and line 255. This would close AND 247 immediately after it opens.

To prevent this, AND 253 is inhibited for a few degrees rotation of the commutator arm, concurrently with a reset of FF246. The output K of FF246 is connected to an inhibit pulse generator 262 and, upon resetting of FF246, generator 262 delivers a short inhibiting pulse to AND 253. Thus, the reset circuit through FF254 to FF245 is inhibited for a short interval.

When the typewriter has completed its type-out of the buffer data, the typewriter counters 233 will have completed their count-down to digit 1 and channel 1, and this condition is employed to send a reset signal through line 263 to FF256. This removes the activating signals in lines 259, 259′ and forces the counters to their 6th digit and 18th channel conditions. The system is then ready to accept the next shear signal for a new coil type-out.

Turn and reprint type-outs are controlled by FF265 and FF266, respectively. Setting signals are supplied thereto through lines 58, 59, as by push button switches. The operator may inadvertently call for such a type-out while the coil data is being typed out. Accordingly, FF265 and FF266 are arranged so that their outputs, upon setting, have no effect. If a coil type-out has been completed, the next pulse from the orbit counter, applied through line 232, resets the corresponding FF and initiates the desired type-out.

However, if a coil type-out is in progress, an inhibiting signal is supplied from OR271 through NOT 272. If either FF245, FF254 or FF256 is in its set position, corresponding signals will be applied to OR 271 through lines 273, 274 and 275. NOT 272 provides an inversion to yield the proper polarity in line 276 to inhibit the resetting of FF265 and FF266. When the coil data have been typed out, the inhibiting signal is removed, and the next pulse in line 232 resets the turn or reprint FF to initiate operation.

For a turn type-out, the resetting of FF265 delivers a signal through line 226 to the turn transfer FF of FIG. 10. It also sets FF277. In its reset condition, FF277 supplies an output through line 238 to tab 237 (FIG. 20) which prevents tabulation. However, when it is set, the inhibiting signal is removed.

Since turn type-out may be demanded immediately after a coil type-out, the typewriter carriage must be given time to return to its initial position, and then additional time to tabulate to column 18 of FIG. 19. While separate delay circuits could be provided for the purpose, the typewriter counters 233 are not required to operate at this time. Hence, for convenience, the counters are used to provide the required delays. A single count-down takes approximately 15 seconds, which is ample for the purpose.

Output K of FF277 is supplied through line 278 to OR 258 and 258′, thereby activating the typewriter counter. At a predetermined count-down, selected so that the carriage will have had time to return to its initial condition, a tabulate signal is sent through line 279 (FIG. 20) to tab 237, and thence to the typewriter. Later in the count-down, a signal is delivered through line 281 to FF277 to reset the latter. This interval is selected to allow time for the carriage to move to its tab position, ready to type out column 18 information.

The resetting of FF277 reestablishes the tab inhibiting signal in line 238. The output K goes positive, and the corresponding signal through line 278 removes the activating signals to the typewriter counters and forces them to their initial conditions (6th digit and 18th channel).

The K output also triggers FF282 to its set position. The next orbit pulse from line 232 is fed through line 283 to reset FF282. This delivers a signal through line 284 to set FF256, thereby causing the buffer information to be typed out, as described above for the coil print-out.

For reprint, the same procedure takes place as for turn type-out, except that the information is already in the buffer so that no transfer signal is required.

Figure 22:
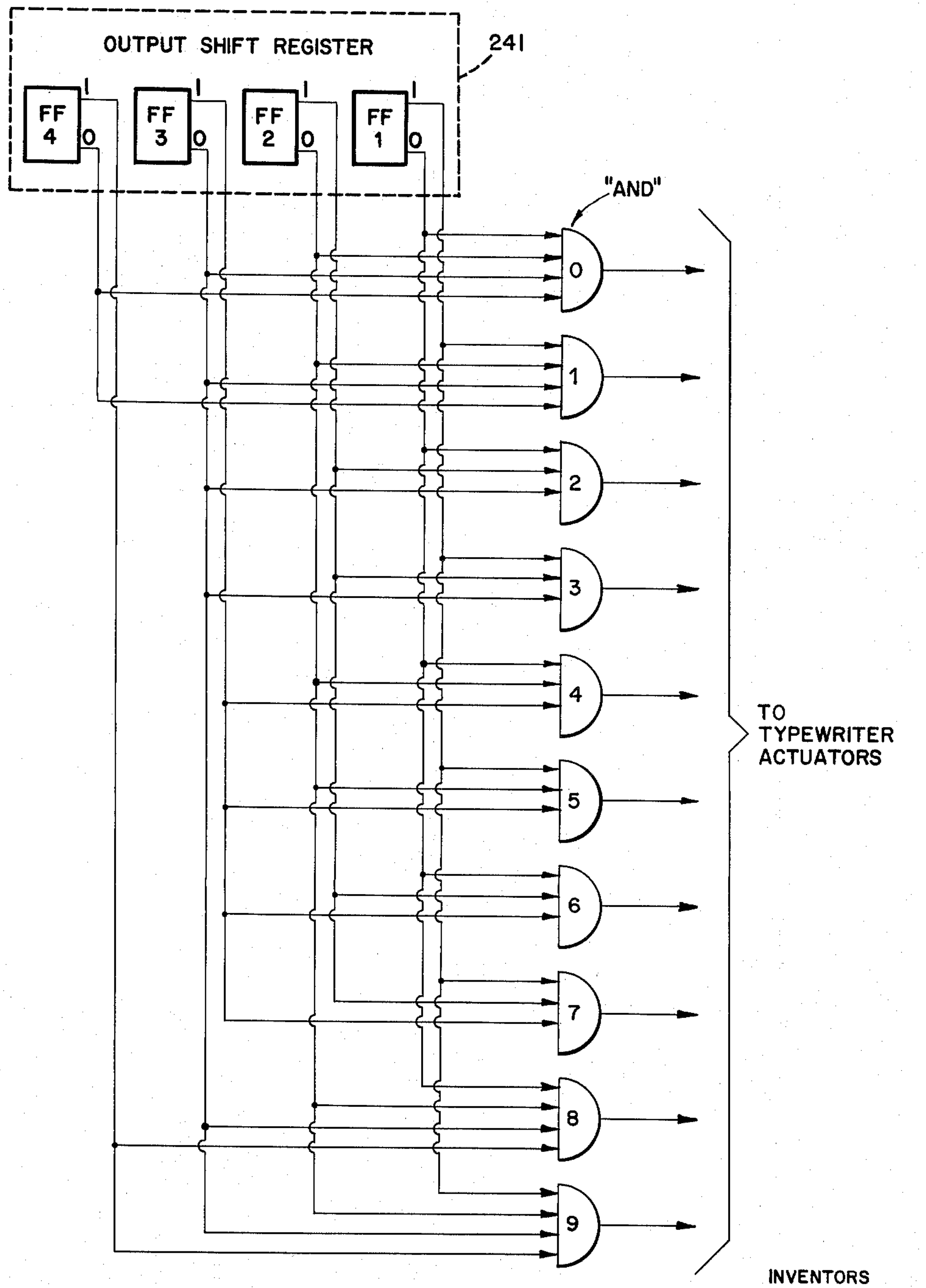
FIG. 22 illustrates a binary to decimal matrix.

Referring now to FIG. 22, the binary-to-decimal matrix 244 of FIG. 20 is illustrated. At the top is the shift register 241 containing four FF circuits for the four binary bits representing a single decimal digit. The outputs of each FF are labeled "1" and "0" to indicate that positive signals are at respective terminals for the corresponding status in the FF.

The outputs of the FF circuits are connected in various combinations to AND gates labeled "0" through "9," corresponding to the digits supplied from the outputs thereof to the typewriter actuators.

It would be possible to recognize the status of each of the four FF stages in determining the corresponding digit. However, a four-stage register can give sixteen combinations, whereas only ten are used. Thus, using all four stages to recognize only ten combinations is inefficient. More important, an unused combination might fail to cause the typewriter to space, leading to entries being out of column.

It would also be possible to use only the particular combinations of the FF states which are required for the ten digits. This would be satisfactory if the unused combinations were never produced. However, if extraneous pulses get into the system, one of the unused combinations may be accidentally produced. In such a case two typewriter bars might be actuated, since the first three bits of the combination would represent a used combination which would actuate the corresponding bar, and the 4th bit might actuate the 8 or 9 bar, as the case may be.

The matrix shown in FIG. 22 is a modification which is more efficient than the first system mentioned, but prevents double actuation by unused combinations and insures that the typewriter will space.

Referring to FIG. 11, it will be noted that all four bits must be recognized for 0 and 1, in order to distinguish them from 8 or 9. Hence, in FIG. 22 all four "0" outputs are supplied to AND 0. For the numeral 1, the "1" output of FF1 and the "0" outputs of the remaining three stages are supplied to AND 1. If a "1" occurs in FF4, the signal is supplied to AND 8 and 9 and the "0" thereof is supplied to AND 0 and 1 to inhibit the latter.

If a "1" occurs in FF3, it is supplied to AND 4 through 7, as required for recognition. The "0" thereof is also supplied to AND 8 and 9 to inhibit the latter in case a binary 12, 13, 14 or 15 should occur, thereby preventing double actuation. If a "1" occurs in FF2, it is supplied to AND 2, 3, 6 and 7 for recognition. The "0" thereof is supplied to AND 8 and 9 to prevent double actuation in case a binary 10, 11, 14 or 15 should occur.

The interconnections in FIG. 22 need not be described in further detail, since comparison with the middle column of FIG. 11 shows that the necessary conditions of the FF units for producing any digit are satisfied.

Referring back to FIG. 20, from the above discussion it will be understood that at the beginning of a data type-out from the buffer, the position of the typewriter carriage will correspond to the 6th digit of the 18th data channel. Accordingly, it is necessary that the four bits then in register 241 represent that digit. Each time the typewriter is actuated, the carriage moves to the next space, and at that time the four bits representing the next digit must be present in register 241. However, the four bits corresponding to a given digit are recirculating in the buffer of the output section of FIG. 10 once per orbit, and hence at a much faster rate than the typewriter can accept. Accordingly, register 241 is arranged to store each four bits for the required interval.

Figure 23:
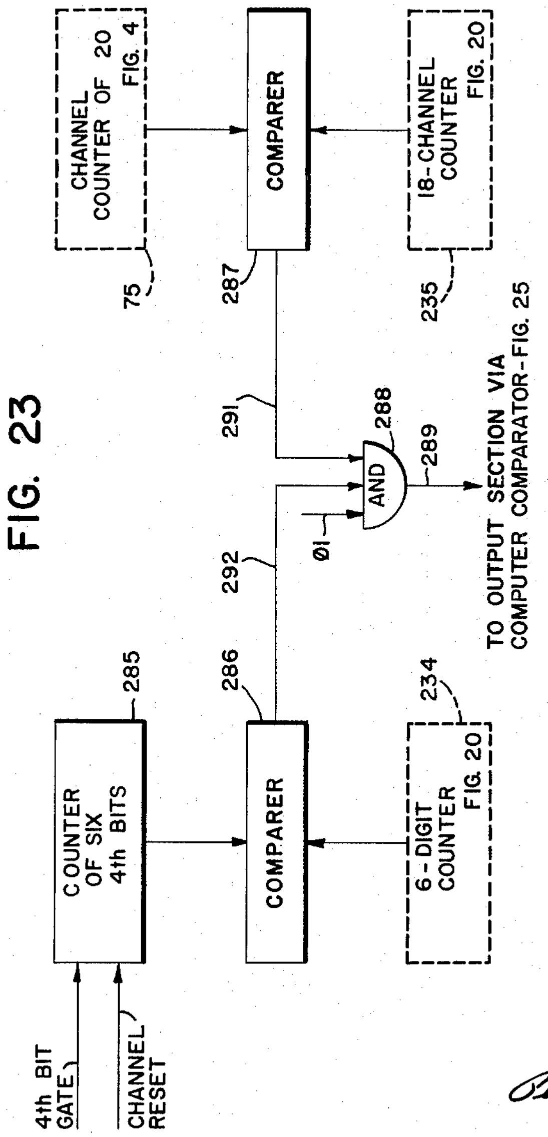
FIGS. 23 and 24 show a counter-comparer and waveforms therefor.

The selection of the proper four bits to actuate the typewriter at any given position of its carriage is effected by the counter comparer shown in FIG. 23. This is physically located in the output section of FIG. 10, as previously mentioned.

Referring to FIG. 23, a counter of six 4th bits is shown at 285. This is supplied with the 4th bit gate and changes from one count to the next at each occurrence thereof. Therefore, a given count in 285 lasts for 240 microseconds, which is the interval between 4th bit gates as shown at (*g*) of FIG. 12. The status of the counter 285 is supplied to comparer 286. The status of the 6-digit counter 234 is also supplied to comparer 286. As actually illustrated in FIG. 20, the status is supplied through repeaters 236 but this is not shown in FIG. 23 for simplicity.

The status of the channel counter of 20 in FIG. 4 is supplied to comparer 287, which is also supplied with the status of the 18-channel counter 235 in the typewriter counter. The outputs of the comparers are supplied to AND 288, along with a $\phi 1$ gate so that the operation is confined to the data in the buffer phase.

Comparer 287 compares the states of the 20-channel and 18-channel counters, and when they are in the same counting condition, say channel 18 in each case, the output thereof in line 291 enables AND 288. When, during this channel, the states of the counters 285 and 234 are the same, say the 6th digit, an enabling signal is likewise supplied through line 292 to AND 288. Thus, AND 288 opens during phase 1 of the proper digit and channel for extracting information from the buffer.

The output of AND 288 is supplied through line 289 to the output section (FIG. 20) via the computer comparator (FIG. 25). The latter is a voting circuit for correlating the three computers. If only one computer were employed, line 289 would be connected to the input of NOT 243 of FIG. 20 in order to supply shift pulses thereto.

Figure 24:
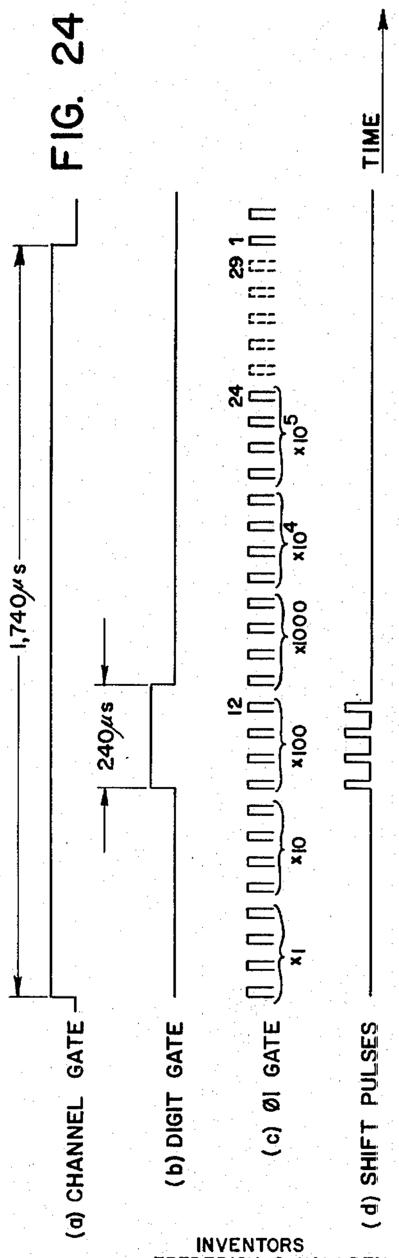

FIG. 24 illustrates the operation of FIG. 23. Here a channel gate appearing in line 291 is shown at (*a*), representing the coincidence of the channel counters 75 and 235. It will last for a data channel interval of 1740 microseconds since the count in 75 then changes. However, since counter 235 remains in a given count for nearly a second, there will be a number of recurrences of the gate shown at (*a*) before it changes to a new channel.

The digit gates appearing in line 292 are shown at (*b*). It is here shown as corresponding to the 3rd digit and has a duration of 240 microseconds, as determined by counter 285. Here also, since counter 234 remains in a given count for about one-seventh of a second, a number of digit gates will occur during the interval between successive typewriter actuations.

The $\phi 1$ gate is shown at (*c*) of FIG. 24 and the pulses are grouped in units of four representing the units, tens, etc. orders. Accordingly, four shift pulses will appear in output line 289, as shown at (*d*). These will, after comparison with similar shift pulses from other computers, be supplied to NOT 243 of FIG. 20.

Data pulses from the buffer will appear at lines 242, 242′ of the shift register 241 in FIG. 20 in rapid succession. However, they will have no effect until shift pulses are likewise applied to the register. Consequently, the application of shift pulses as shown at (*d*) of FIG. 24 will control the entry of data pulses into shift register 241. After the initial entry of four bits in register 241, they will be re-entered several times during the interval between successive typewriter actuations. During the re-entry, the status of the FF units in 241 will change rapidly until the correct four bits are again stored therein. The typewriter actuators are too slow-acting to respond to this momentary rapid progression, so that no difficulty arises.

*Computer comparator*

Figures 25A, 25B, 25C:
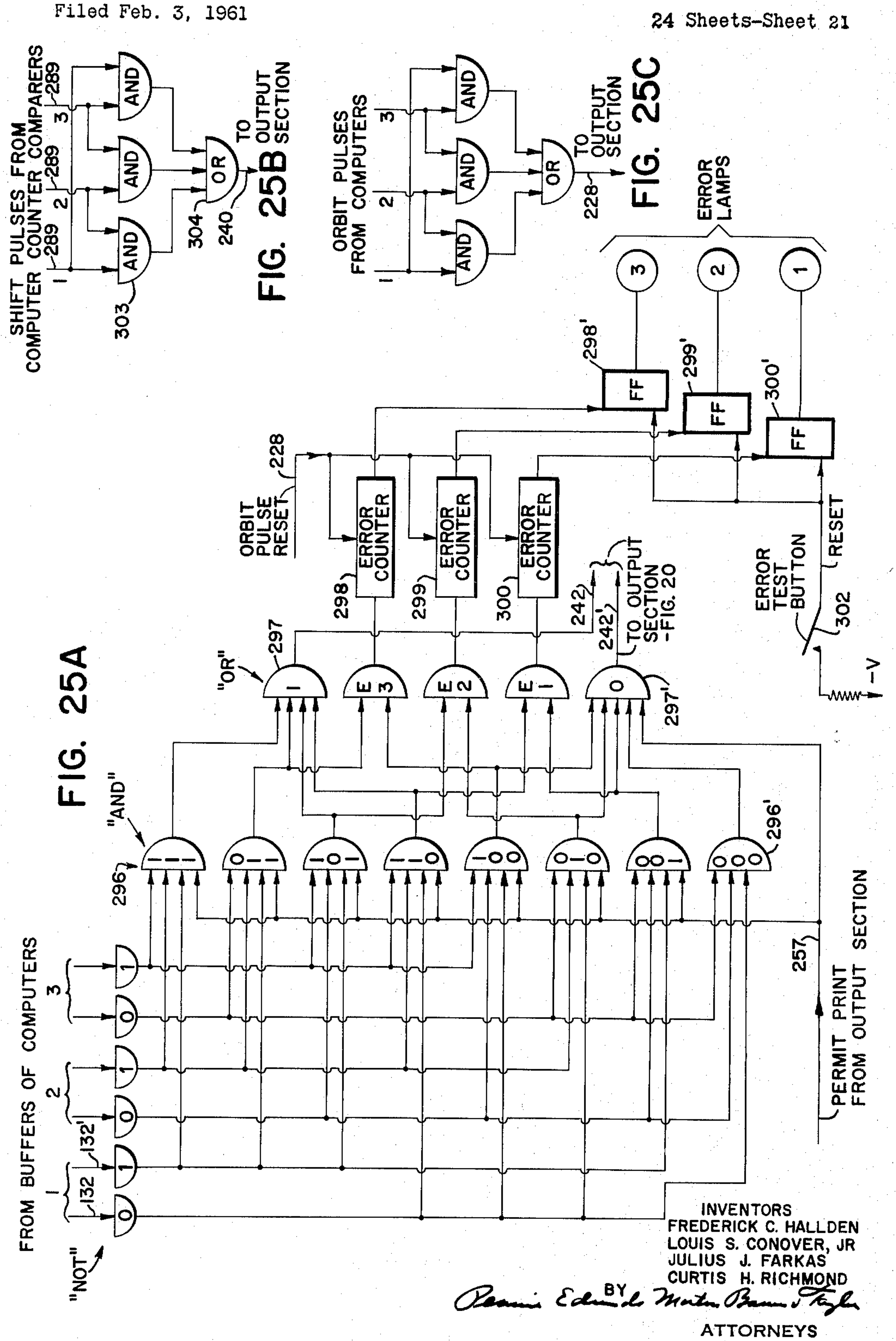
FIGS. 25A, 25B and 25C show computer comparator units.

Considering now the voting between the three computers of FIG. 2, this takes place in the computer comparator 52, which is shown in FIGS. 25A, B and C.

For the buffer data in the accumulator (FIG. 10) of each computer, the voting is bit by bit. Since a given bit can only result in a "0" or "1," two computers must agree as to that particular bit of information. Accordingly, the bit agreed upon is fed to the output circuit (FIG. 20). If one computer does not agree as to that particular bit, an error is counted for that computer. This procedure tends to minimize errors due to random causes. However, if a computer is out of order, it should result in considerably more error counts. It can then be taken out of service, and one of the other computers relied upon until repairs have been made.

The computer comparator contains three voting circuits, one for buffer data, another for the shift pulses shown at (*d*) of FIG. 24, and another for orbit pulses. These are shown in FIGS. 25A, B and C, respectively.

Considering first FIG. 25A, the outputs of the buffer shift registers (124 in FIG. 10) in the three computers are supplied to NOT circuits 295. These NOT circuits are labeled "0" or "1" to correspond to the condition of the output stage of each buffer shift register. They are employed primarily for isolation purposes and to supply outputs of adequate power. Since they also invert, output line 132 (FIG. 10) is connected to a "0" NOT circuit, since a positive pulse in line 132 representing "1" will give a negative output from the NOT circuit corresponding to "0." Similarly, output line 132' is connected to a "1" NOT circuit.

AND circuits generally designated as 296 are connected to the outputs of the NOT circuits in all possible combinations, as indicated by the numerals in the AND circuits. Thus, the top one is connected to the "1" NOT circuits and the bottom one to the "0" NOT circuits. Those in between represent various combinations from the three computers. The upper numeral in each AND 296 is from computer 3, the middle from computer 2, and the lower from computer 1.

Voting takes place only during a print-out cycle. Thus, the "permit print" signal in line 257 (FIG. 21) is supplied to all AND circuits except the bottom one designated 296', to keep them closed except during a print-out cycle.

The outputs of all AND circuits 296 in which "1" predominates are connected to OR 297 which gives a "1" output to line 242. This line is connected to the input of shift register 241 (FIG. 20). Similarly, all AND circuits in which "0" predominates are connected to OR 297', which delivers an output signal to line 242'.

In the absence of a permit print signal, it is desired to clear the shift register 241 in the output section so that all stages are at "0". Accordingly, no inhibiting signal from line 257 is supplied to AND 296' since it is unnecessary. However, OR 297' is supplied with the permit print signal. In the absence of the signal, line 257 will be negative, thus yielding a positive output in line 242' corresponding to 0. Since the other AND circuits 296 are closed, in the absence of a permit print signal, their outputs will be positive, thus yielding a negative output from OR 297 to line 242, which also corresponds to 0 at the input to shift register 241.

If the upper and lower AND circuits are actuated, all three computers are correct. If one of the other AND circuits is actuated, a corresponding signal is sent to one of the OR circuits designated E3, E2 and E1. E3 represents an error in the third computer and consequently is fed from the AND circuits having the upper numeral in the minority. Similarly, OR E2 is supplied from the AND circuits having the middle numeral in the minority, and OR E1 from those having the lower numeral in the minority.

These error OR circuits are connected to respective error counters 298, 299 and 300, whose outputs actuate respective FF's 298'–300' which in turn light respective error lamps.

For a given total in the buffer, counting the errors during one orbit suffices to give the total number of errors. This could conceivably be 24×18 errors in an extreme case. If errors were counted in successive orbit cycles, large numbers would be obtained which would have little significance. Accordingly, the error counters 298–300 are reset by an orbit pulse through line 228 so that they begin their count anew for each orbit cycle.

One or a few errors during an orbit may indicate only extraneous signals, rather than malfunctioning of the particular computer. Accordingly, the counters are arranged to count a predetermined number of errors, say 15, before actuating the respective FF units and lamps.

When an operator sees a light, he may wish to make sure that the computer is malfunctioning before taking it out of service. Accordingly, an error test button 302 is provided to reset FF298'–300'. If the same error lamp lights up during a subsequent print-out, he can be more sure.

FIG. 25B shows a comparer for the shift pulses in line 289 of FIG. 23, one from each computer. These are connected in pairs to AND circuits 303 whose outputs are connected to OR 304. As is apparent from the interconnections, shift pulses from two computers must be in agreement before any of the AND circuits open to deliver an output to OR 304. The shift pulses which are in agreement are passed through line 240 to NOT 243 of FIG. 20.

FIG. 25C is a similar comparer for orbit pulses from the three computers, and those in agreement are passed through output line 228 to the orbit counter 229 of FIG. 20.

*Computer synchronization*

Proper operation of the system as a whole requires not only that each computer be internally synchronized, but also that the three computers as a whole be kept in synchronism. Insofar as an individual computer is concerned, most of the internal synchronization has been described. One further aspect may be mentioned, namely synchronization between equalizing and accumulator sections.

Referring back to FIG. 10, gate generator 121 is shown as supplied with 50 kc. pulses. These are the same as supplied to the foot address and channel counters of FIG. 4. It is also desired to have gate generator 121 in proper phase at the beginning of each channel. The generator is conveniently a counter, so that proper synchronization can be obtained by having the generator start its count at the start of the count in the foot address counter 74 of FIG. 4. Accordingly, a signal corresponding to the initial condition of counter 74 is supplied to gate generator 121 to force it to its initial condition, thereby assuring proper synchronization. The details of effecting such synchronization are known in the art.

Figure 26:
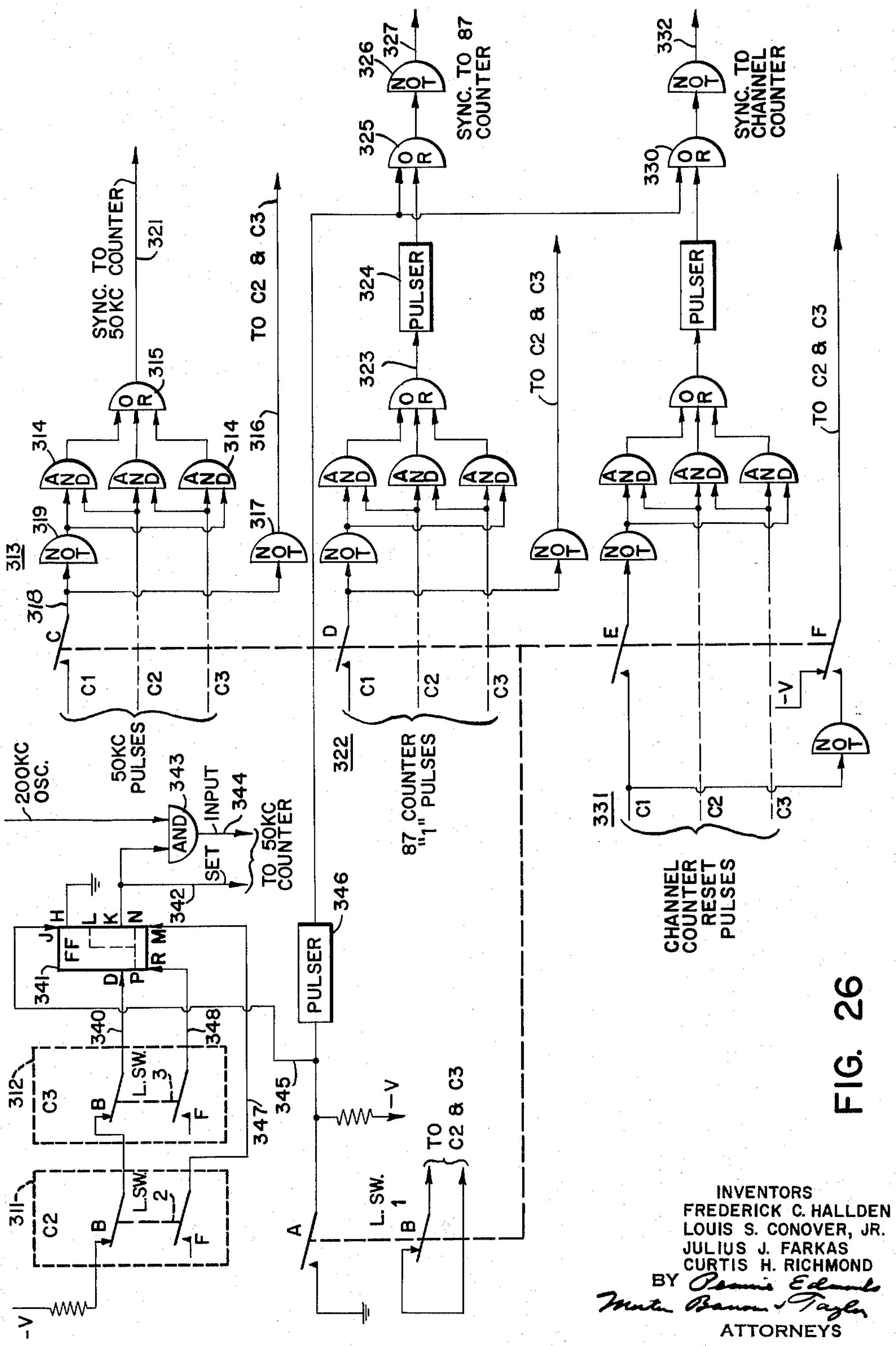
FIG. 26 shows a computer synchronizer.

Considering now the synchronization of the three computers, this is shown in FIG. 26. Each computer has a similar synchronizing circuit (72 in FIG. 3), and that for computer 1 is shown in FIG. 26. However, since certain interrelationships are involved, small portions of the other two computer circuits are shown by dotted boxes 311 and 312. In the figure, the designations "C1," "C2" and "C3" are used to designate respective computers.

Each computer contains a ganged switch, called a logic switch (L.Sw.), having switch sections A–F. The logic switches are actuated in sequence in starting, and in operation all sections are closed except the B sections. Sections A, B and F relate to initial synchronization, and discussion thereof will be deferred.

Assuming that the computers have been started properly, subsequent synchronization involves maintaining the 50 kc. counters 73 (FIG. 4), the foot address counters 74, and the channel counters 75 in synchronism in the three computers.

In FIG. 26 the 50 kc. synchronizing circuit is generally designated 313. 50 kc. pulses from each of the three computers are fed to AND circuits 314, whose outputs are fed to OR 315. These are interconnected as a voting circuit, as described in connection with FIG. 25B. The 50 kc. pulses of computer 1 are supplied to the other two computers through line 316. NOT 317 is employed as a repeater. It is assumed that positive pulse outputs are desired in line 316, and accordingly negative 50 kc. pulses from computer 1 are supplied through line 318, and these are inverted by NOT 319 for application to the voting circuit. Inasmuch as the 50 kc. inputs from C2 and C3 will be from a line 316 therein, no inversion of these pulses is required.

From the previous description of the voting operation, it will be apparent that 50 kc. pulses will appear in line 321 corresponding to the two computers that are in synchronism (or all three). These are applied to the 50 kc. counter 73 in computer 1 to keep it in synchronism.

It will be understood that if a single 50 kc. master oscillator were employed, rather than the 200 kc. master oscillator, this portion of the synchronizing circuit would be unnecessary.

The 87-counter synchronizing arrangement is generally designated 322. Here, input pulses corresponding to the initial condition of the counters in the three computers are fed to a voting circuit like that just described, and pulses in line 323 correspond to initial conditions of two (or three) of the counters. These pulses are used to trigger pulser 324 in order to obtain uniform pulses of given length, say 10 microseconds. These are fed through OR 325 and NOT 326 to line 327, to synchronize the 87-counter in computer 1. This synchronization may be effected by a D.-C. level set forcing the counter to its initial condition, pulser 324 preventing lock-up in this condition.

OR 325 has another input for initial synchronization, and this will be described later. Since the OR inverts, an additional inversion is produced by NOT 326.

Channel synchronization is obtained by a voting circuit generally designated 331. This is supplied with channel reset pulses from the three computers, and the operation is similar to that of 322, synchronizing pulses being delivered through line 332 to the channel counter 75 of computer 1.

There is a slight difference in circuit 331. One NOT circuit has been relocated since it is desired to include switch section F in the output line to C2 and C3 for initial synchronization purposes. In 313 the input circuit to NOT 317 is open when switch section C is open, and under this condition the NOT output to line 316 is negative. The same result is accomplished in 331 by applying —V to switch section F in its upper, or "open," position.

The synchronizing arrangements so far described suffice to maintain synchronization under normal operating conditions. However, it is desirable for the computers, when initially started, to be in synchronism before the voting circuits take over. Accordingly, the logic switches of the three computers are actuated one after the other, in such a manner that, say, computer 2 is first brought into synchronism with computer 1, and then computer 3 into synchronization with the other two.

To this end an FF 341 is provided in each computer. The K output thereof is supplied to line 342 for setting the 50 kc. counter to its initial condition. The K output is also supplied to AND 343 along with the 200 kc. oscillator pulses.

Before closing the logic switch L.Sw.1, FF341 is in a reset condition such that the output K is positive, thereby keeping AND 343 open and allowing 200 kc. pulses to pass to the output line 344 and thence to the input of the 50 kc. counter. The reset condition of FF341 is established by the then closed contacts B of the logic switches in the other two computers, as shown in boxes 311 and 312.

However, when L.Sw.1 is closed in C1, the closing of section A delivers a positive-going pulse to FF341 through line 345 to trigger it to its set condition, thus closing AND 343 and delivering a signal to line 342 which sets the 50 kc. counter to its initial condition. Simultaneously, the closing of section A actuates pulser 346 to deliver a pulse to OR 325 and OR 330, thereby resetting the 87-counter and the 20-channel counter in C1 to their initial conditions.

Line 345 is connected to a capacitor input of FF341, so that shortly after section A is closed the negative potential through line 340 returns FF341 to its original condition, allowing 200 kc. pulses to pass to the 50 kc. counter thereafter.

Insofar as computer 1 is concerned, the resetting to the initial conditions of the three counters therein is unnecessary, provided that computer is always started first. However, the operation would take place if another computer were started up first.

The starting up of the next computer can most easily be understood by assuming that Computer 2 has already been started as just described for Computer 1, and that the latter is started next.

With this assumption, switch section B in 311 will be open, and F closed. Thus there will be channel counter reset pulses from Computer 2 in line 347. However FF341 will be in its reset condition due to prior actuation through sections B.

When L.Sw.1 is now actuated, FF341 will be flipped to its set condition, AND 343 will be closed, and all three counters will be set to their initial conditions as already described. When a channel reset pulse from C2 passes through line 347 to FF341, it resets the latter and AND 343 opens. Thus the counters in C1 start counting from their initial conditions in synchronism with those in C2.

The starting up of the third computer can most easily be understood by assuming that C2 and C3 have already been started as just described for C2 and C1, and that C1 is now to be started. Switch sections B in both boxes 311 and 312 will now be open, and sections F closed. Channel reset pulses from both C2 and C3 will be applied to FF341 through lines 347 and 348. FF341 will already be in its reset condition due to prior acutation through sections B.

When L.Sw.1 is now actuated, FF341 will be set, resulting in cutting off the supply of 200 kc. pulses and resetting the counters in C1 to their initial conditions, in the manner just described. Resetting of FF341 can now be produced by channel reset pulses from either C2 or C3, but since these two computers have already been synchronized no difficulty arises.

The three computers have now been initially synchronized, and thereafter synchronization is maintained by the operation of voting circuits 313, 322 and 331.

The counters have been described as reset to their initial conditions corresponding to channel 1, foot 1, etc. However, other predetermined conditions may be employed for reset, if desired.

*Profile system*

The profile system is designed to record the types of defects occurring along the length of the strip wound on a coil. For this particular application it was sufficient to indicate the types of defects occurring in 10-foot lengths, and it was unnecessary to count the number of defects of a given type occurring in a given 10-foot length. Since great accuracy was not required, only one computer is used to supply defect information to the profile system.

As shown in FIG. 2, the profile system 63 is fed from computer selector 64, which contains switches for determining which computer output is to be used.

Figure 27:
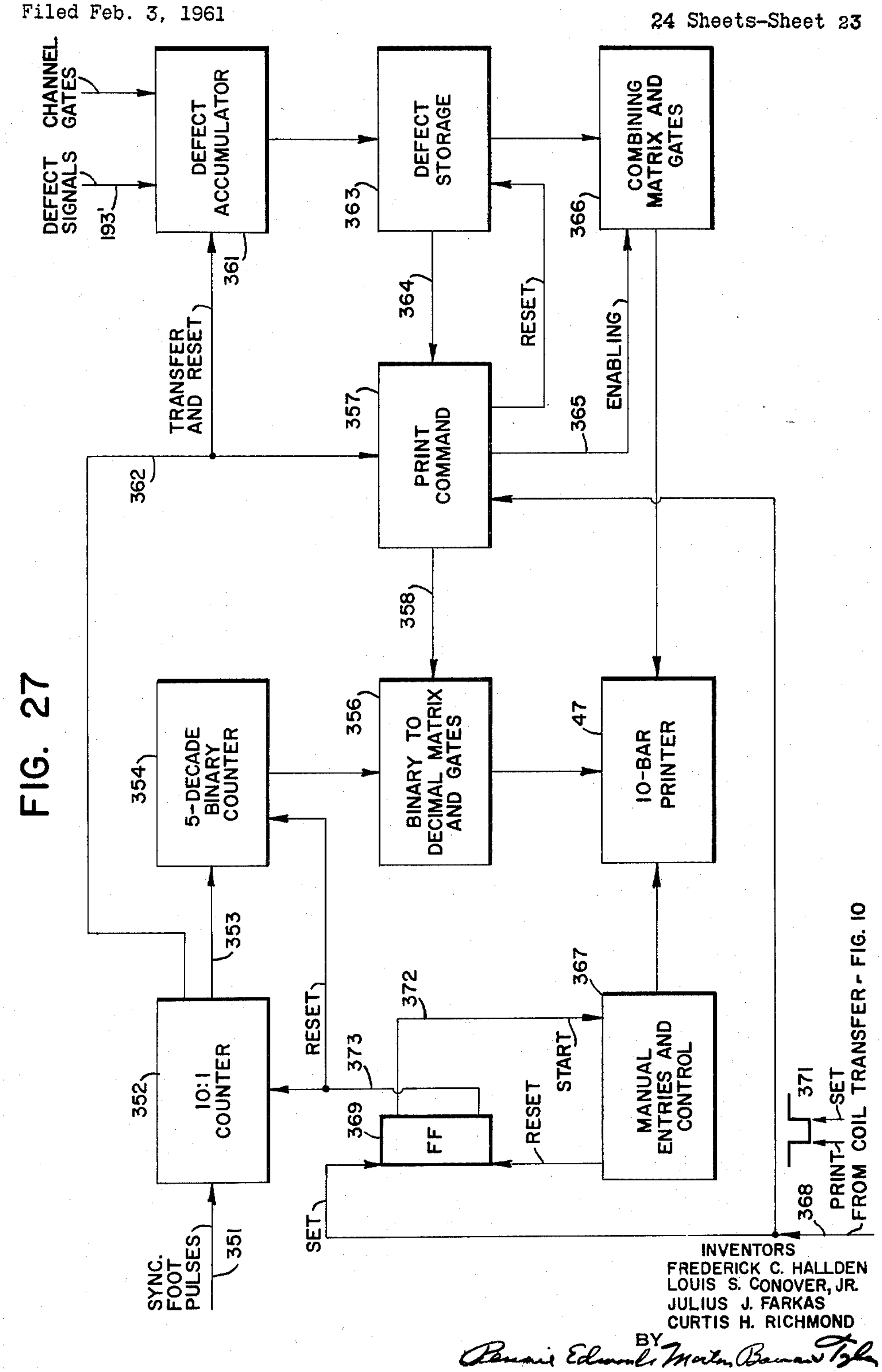
FIG. 27 illustrates a profile system.

FIG. 27 shows the arrangement of the profile system 63. Synchronized foot pulses from 82 of FIG. 4 are fed through line 351 to a 10:1 counter 352 which gives a pulse output in line 353 for each 10-foot length of the strip. A binary decade counter 354 counts these pulses so that the particular 10-foot length in which defects occur can be printed out. A 5-decade counter is here shown, to provide ample capability.

Since 10-foot lengths may pass in rapid succession, simultaneous rather than successive print-out is desirable. Accordingly a 10-bar printer 47 is employed, capable of printing ten characters simultaneously. Each character may be any digit from 0 to 9. The binary count in 354 is converted to a decimal count in matrix 356, and gates are provided in 356 so that the count is printed out by 47 only when the gates are opened by a signal from print command 357 through line 358. The output of counter 352 is also fed to print command 357 to confine its operation to 10-foot intervals.

Defect information is obtained from coil carry FF in the coil register 122 of FIG. 10 through line 193′. This is connected to defect accumulator 361, and data channel gates are also fed thereto from gate generator 76 (FIG. 4). Accumulator 361 may contain, say, 14 FF units which are enabled by respective channel gates and actuated when a defect signal arrives in the respective channel. Once a given FF is actuated, subsequent defects in that channel have no effect until it is reset. Reset of all FF's in the accumulator 361 is obtained by a reset signal from counter 352 through line 362 at the end of each 10-foot length of strip.

To provide time for print-out while still accumulating data for the next 10-foot length, information in accumulator 361 is transferred to a defect storage unit 363 just prior to the resetting of 361. The transfer may be effected by gates, as will be understood. Storage unit 363 may also contain 14 FF units actuated by the corresponding units in 361.

It is undesirable to print-out when there are no defects to be recorded. Accordingly storage unit 363 is connected to print command 357 through line 364, so that a command signal is produced at the end of a 10-foot length only if a defect has occurred. The command signal is fed to gates in 356, as before mentioned, and also through line 365 to enable gates in a combining matrix and gate unit 366.

Since counter 354 can count to five figures, five of the positions of the 10-bar printer 47 are used for designating the particular 10-foot length. This leaves five for recording defects, which is insufficient if all 14 types of defects occur in a 10-foot length. For the requirements of this embodiment, it suffices to group the defects into five groups, with the defects in each group arranged in the order of their importance so that the more important defect will be recorded if more than one occurs in that group. For example, the following grouping may be employed:

| | Printer position | Numeral | | |
|---|---|---|---|---|
| Top coating | 6 | 0-On gage | 1-Light | 2-Heavy. |
| Bottom coating | 7 | do | do | Do. |
| Base | 8 | do | do | Do. |
| Welds and pinholes | 9 | 0-None | 1-Pinhole | 2-Weld. |
| Visual defects | 10 | 1, 2, 3, 4, 5, 6 | | |

With this grouping, if the top coating is sometimes light and sometimes heavy in a given 10-foot length, the numeral "1" will be printed in position 6. If visual defects 3 and 5 occur, defect 3 will be printed in position 10, etc.

The desired grouping is accomplished in matrix 366, using the information from storage 363. When the gates in 366 are opened by a print command signal, the data is printed by 47, along with the particular 10-foot length. Print command 357 then sends a reset signal to storage 363.

At the end of a coil, it is desired to print out certain information concerning that coil such as the coil number and lot number. The total number of feet on the coil is also desired.

A manual entries and control unit 367 is employed for entering coil information. This may be similar to that employed in the output unit of FIG. 20, but simpler, and in practice portions of the same unit are employed for both purposes.

This supplemental print-out is controlled by a signal at the time the prime shear (34 in FIG. 1) is actuated. The signal is conveniently obtained from the coil transfer FF133 (FIG. 10), since it is actuated automatically at the end of each coil. Thus the signal is fed through line 368 to set FF369, and also to actuate print command 357.

The signal is shown at 371. The leading edge is used to actuate print command 357 so that the then-existing count of counter 354 is printed. The trailing edge sets FF369 at the end of the coil transfer cycle. This allows sufficient time for the print-out of total footage.

When FF369 is set, it delivers a start signal through line 372 to the manual entries unit 367, and the entries are then printed out. When this is completed, unit 367 sends a reset signal to FF369.

When FF369 is set, it also delivers a signal through line 373 to reset counters 352 and 354 to their initial conditions, and holds them there. When FF369 is reset, the counters are allowed to start counting anew for the next coil.

*Alternative accumulator*

The accumulator of FIG. 10 employs a single delay line for loop storage, and buffer, coil and turn data are stored therein in successive phases, bit by bit. This is termed sub-interleaving.

Figure 28:
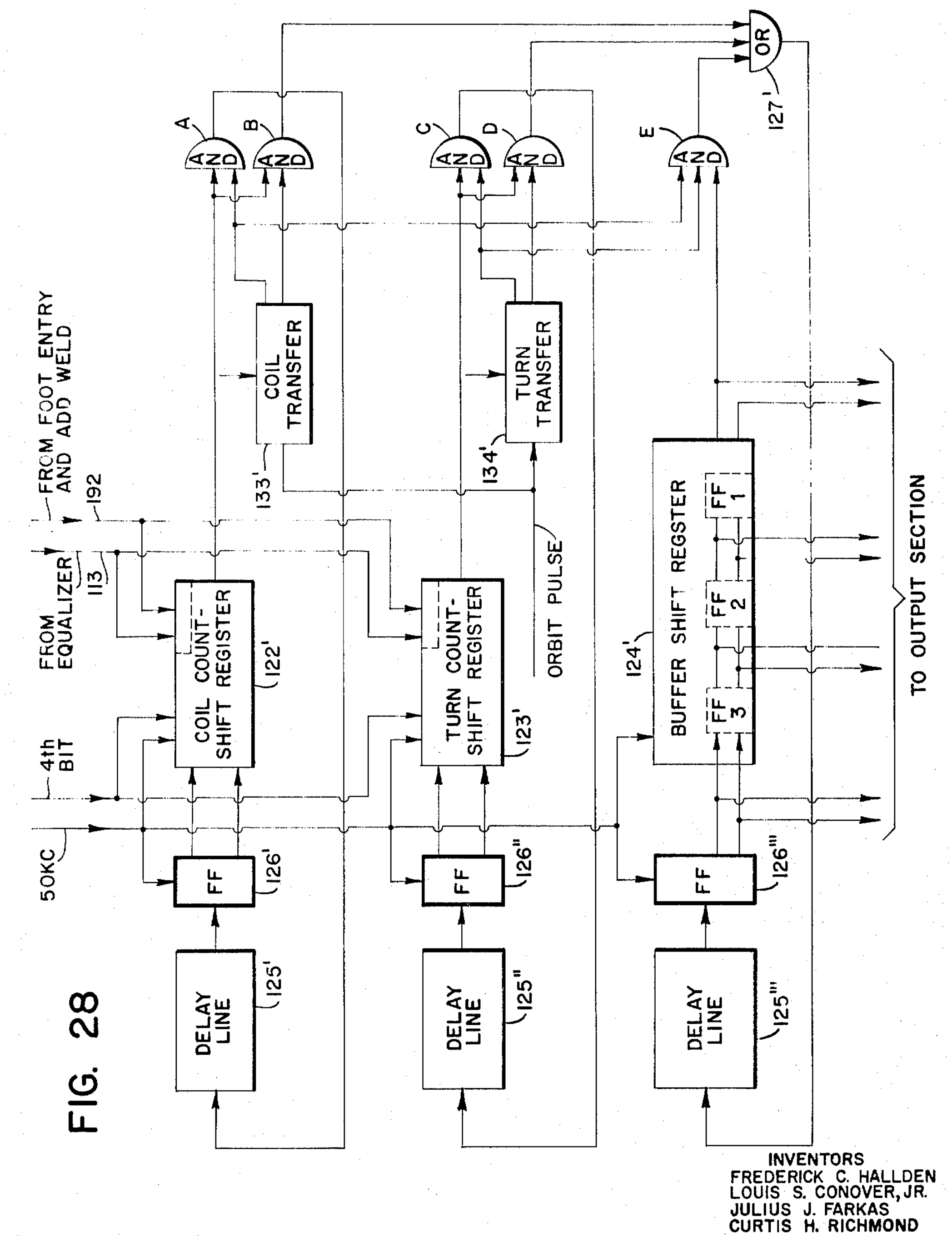
FIG. 28 illustrates an alternative accumulator.

FIG. 28 shows an accumulator utilizing separate storage loops with separate delay lines for buffer, coil and turn data. Components similar to those in FIG. 10 are given the same numerals, with an added prime, double prime, etc. The overall operation will be clear from the description of FIG. 10, and only certain differences need be mentioned.

Since sub-interleaving is not employed, it is unnecessary to use separate phases, and the $\phi 1$, $\phi 2$, etc. gates are eliminated. Data bits may emerge from all the channels at the same time, e.g., the first bit in the first digit in the first data channel emerges from AND E in the buffer loop at the same time it emerges from AND A and AND C in the coil and turn loops. The bits may be at 20 microsecond intervals, and consequently 50 kc. shift pulses may be employed, with the 4th bit gate recurring at 80 microsecond intervals. Transfer from coil or turn channels to the buffer channel take place as before, AND B and AND D being employed for the purpose.

The accumulator of FIG. 28 is also shown for a single computer system, in which case no voting occurs. Consequently data for all four bits of a given digit may be simultaneously withdrawn from the buffer shift register 124′, rather than successively as shown in FIG. 10. (Successive withdrawal permits a single data voting circuit to be employed, but this is no longer required.) Accordingly, the four FF units in the shift register 241 of FIG. 20 may be connected as repeaters for FF126″ and the FF's in 124′ of FIG. 28, respectively, and transfer thereto gated to occur only during 4th bit intervals.

*Conclusion*

The invention has been described in connection with a specific embodiment thereof which is a fairly elaborate system capable of performing many operations. It will be understood that when a less elaborate system suffices, various parts of the system may be simplified, or entirely eliminated. Also the types of data which are detected and accumulated may vary widely in different applications. Where desired, components of the present invention may be used with other components different from those described.

Detailed circuitry has been shown for many of the system components, for completeness of disclosure. However, it will be understood that many alternative arrangements are possible, and may be used if desired.

Many waveforms are shown in the drawings to illustrate the circuit operation. These are idealized for convenience and clarity of presentation, and in practice considerable departures from the forms shown will commonly be encountered, as will be clear to those skilled in the art.

We claim:

1. In a data accumulation system in which different characteristics of a moving strip of material are detected at a distance from a predetermined point, the combination which comprises a loop storage system for recirculating signals applied thereto, means for establishing a plurality of data channel intervals in a loop cycle, means for establishing a plurality of sub-intervals within said channel intervals, means for applying input signals representing different strip characteristics to said loop storage system in respective different channel intervals and in sub-intervals therein corresponding to the distances from said predetermined point at which the characteristics are detected, means for shifting signals in said loop storage system to successive sub-intervals in respective channels in timed relationship with the strip movement, means for extracting signals from the loop storage system when the signals arrive at predetermined sub-intervals in respective channels, a second loop storage system having at least one data accumulating channel and an auxiliary channel, means for establishing a plurality of cyclically recurring data channels in said accumulating and auxiliary channels, means for applying said extracted signals to corresponding data channels of said accumulating channel to produce accumulated totals thereof in accordance with a predetermined code, and means for transferring said totals from said accumulating channel to said auxiliary channel in corresponding data channels thereof and eliminating the transferred totals from said accumulating channel.

2. In a data accumulation system in which different characteristics of a moving strip of material are detected at respective distances from a predetermined point, the combination which comprises a loop storage system for recirculating signals applied thereto, means for establishing a plurality of channel intervals in a loop cycle, means for establishing a plurality of sub-intervals within said channel intervals, means for applying input signals representing different strip characteristics to said loop storage system in respective different channel intervals and in sub-intervals therein corresponding to the distances from said predetermined point at which the characteristics are detected, means for shifting signals in said loop storage system to successive sub-intervals in respective channels in timed relationship with the strip movement, means for producing a marker pulse for each movement of said strip through a predetermined distance, means for utilizing said marker pulses to control the shifting of the signals in said loop storage system to successive sub-intervals, and means for extracting signals from the loop storage system when the signals arrive at predetermined sub-intervals in respective channels.

3. In a data accumulation system in which data signals representing different types of information occur during successive cyclically recurring intervals, the combination which comprises a loop storage system for recirculating signals applied thereto, said loop storage system having at least one data accumulating channel and an auxiliary channel, means for establishing a plurality of cyclically recurring data channels in said data accumulating and auxiliary channels, means for applying said data signals to respective data channels of said accumulating channel to produce accumulated totals thereof in accordance with a predetermined code, and means for transferring said totals from said accumulating channel to said auxiliary channel in corresponding data channels thereof and eliminating the transferred totals from said accumulating channel.

4. In a data accumulation system in which data signals representing different types of information occur during successive cyclically recurring intervals, the combination which comprises a storage loop for recirculating binary-coded signals, means for establishing alternate recurring bit-intervals in said storage loop for a plurality of binary-coded signals to provide a plurality of storage channels, means for establishing a plurality of cyclically recurring data channels in said plurality of storage channels, means for applying said data signals to respective data channels of one of said storage channels to produce accumulated totals thereof in accordance with a predetermined binary code, and means for transferring said totals bit-by-bit from said one storage channel to another storage channel in corresponding data channels thereof.

5. A system for the accumulation of data relating to different characteristics of a moving strip of material, which characteristics are detected by sensors located at respective distances from a reference point, comprising (a) means for producing foot pulses representing the passage of successive strip portions of unit length past the reference point, (b) means responsive to said sensors for producing discrete pulse signals representing occurrences of said different characteristics in the successive strip portions, (c) storage means for storing the pulse signals at addresses each consisting of a channel address and a foot address, (d) means for applying said signals to said storage means at addresses wherein the channel address corresponds to the respective characteristic and the foot address corresponds to the distance of the respective sensor from the reference point, (e) means responsive to the foot pulses for changing the foot address of each of the stored signals through a series of steps corresponding to decreasing distances from the reference point until the foot address of said signal corresponds to zero distance from the reference point, (f) accumulator means for counting the successive strip portions of unit length which move past the reference point and for counting the signals representing occurrences of the different characteristics in the successive strip portions, and (g) means responsive to the foot pulses for transferring said signals to the accumulator means from said foot addresses corresponding to zero distance from the reference point.

References Cited by the Examiner

UNITED STATES PATENTS

| | | | |
|---|---|---|---|
| 2,628,346 | 2/1953 | Burkhart | 340—149 |
| 2,797,862 | 7/1957 | Andrew et al. | 340—172.5 |
| 2,803,703 | 8/1957 | Sherwin | 340—172.5 |
| 3,093,730 | 6/1963 | Propster. | |

ROBERT C. BAILEY, *Primary Examiner.*

IRVING L. SRAGOW, WALTER W. BURNS, JR., MALCOLM A. MORRISON, *Examiners.*

L. W. MASSEY, W. M. BECKER, *Assistant Examiners.*